United States Patent
Miyamoto et al.

(10) Patent No.: US 10,042,423 B2
(45) Date of Patent: Aug. 7, 2018

(54) ELECTRONIC DEVICE AND DRIVE CONTROL METHOD

(71) Applicant: FUJITSU LIMITED, Kawasaki-shi, Kanagawa (JP)

(72) Inventors: Akinori Miyamoto, Sagamihara (JP); Yuichi Kamata, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/982,290

(22) Filed: Dec. 29, 2015

(65) Prior Publication Data
US 2016/0209923 A1   Jul. 21, 2016

(30) Foreign Application Priority Data
Jan. 16, 2015 (JP) .................................. 2015-006988

(51) Int. Cl.
*G06F 3/01* (2006.01)
*G06F 9/448* (2018.01)
(Continued)

(52) U.S. Cl.
CPC ............ *G06F 3/016* (2013.01); *G06F 1/1637* (2013.01); *G06F 3/0488* (2013.01); *G06F 2203/014* (2013.01)

(58) Field of Classification Search
CPC .......... G05B 2219/40553; G06F 3/016; G06F 3/04886; B60W 50/16; F15B 13/14; H01H 13/85
See application file for complete search history.

(56) References Cited

U.S. PATENT DOCUMENTS

| 8,421,642 B1 * | 4/2013 | McIntosh | ................ G06F 3/017 340/539.1 |
| 8,666,562 B2 * | 3/2014 | Tuononen | ............... B60T 8/172 701/1 |

(Continued)

FOREIGN PATENT DOCUMENTS

| JP | 2010-231609 | 10/2010 |
| JP | 2011-129091 | 6/2011 |
| JP | 2012-83111 | 4/2012 |

OTHER PUBLICATIONS

Espacenet English Abstract of Japanese Patent Application No. 2011-129091 published Jun. 30, 2011.

(Continued)

*Primary Examiner* — William Lu
(74) *Attorney, Agent, or Firm* — Staas & Halsey LLP

(57) ABSTRACT

An electronic device that includes a top panel having a manipulation input surface, a position detector detecting a manipulation input, a vibrating element generating a vibration in the manipulation input surface; and a drive control part being configured to drive the vibrating element by using a driving signal causing the vibrating element to generate a natural vibration in an ultrasound-frequency-band in the manipulation input surface, the drive control part driving the vibrating element so as to vary an intensity of the natural vibration in accordance with the position of the manipulation input performed onto the manipulation input surface and a temporal change degree of the position, wherein a thickness of the top panel is set that makes a wavelength of a standing wave generated on the top panel shorter than a wavelength of a ultrasound wave in the air at a frequency of the driving signal.

13 Claims, 17 Drawing Sheets

(51) Int. Cl.
*G06F 3/0488* (2013.01)
*G06F 1/16* (2006.01)

(56) References Cited

U.S. PATENT DOCUMENTS

| | | | | |
|---|---|---|---|---|
| 2008/0122315 | A1* | 5/2008 | Maruyama | G06F 3/016 310/314 |
| 2009/0051662 | A1* | 2/2009 | Klein | G06F 3/016 345/173 |
| 2009/0059726 | A1* | 3/2009 | Okuda | G01S 7/521 367/178 |
| 2009/0085439 | A1* | 4/2009 | Okuda | G01S 7/521 310/334 |
| 2010/0078343 | A1* | 4/2010 | Hoellwarth | B29C 45/14639 206/320 |
| 2011/0115734 | A1* | 5/2011 | Harashima | G06F 3/016 345/173 |
| 2011/0140870 | A1* | 6/2011 | Ullrich | A61B 34/76 340/407.2 |
| 2011/0260990 | A1* | 10/2011 | Ali | G06F 3/016 345/173 |
| 2012/0081337 | A1* | 4/2012 | Camp, Jr. | G06F 3/0436 345/177 |
| 2012/0223880 | A1* | 9/2012 | Birnbaum | G06F 3/015 345/156 |
| 2013/0114195 | A1* | 5/2013 | Lee | H01H 13/83 361/679.01 |
| 2013/0229384 | A1* | 9/2013 | Adachi | G06F 3/016 345/174 |

OTHER PUBLICATIONS

Espacenet English Abstract of Japanese Patent Application No. 2010-231609 published Oct. 14, 2010.
English Abstract of Japanese Patent Application No. 2012-83111 published Apr. 26, 2012.
Michaël Wiertlewski et al, "Power Optimization of Ultrasonic Friction-Modulation Tactile Interfaces", IEEE Transaction on Haptics, vol. 8, No. 1, Jan.-Mar. 2015, pp. 43-53.

* cited by examiner

| MOVING SPEED | AMPLITUDE VALUE |
|---|---|
| $0 \leq V < b1$ | 0 |
| $b1 \leq V < b2$ | A1 |
| $b2 \leq V < b3$ | A2 |
| | |

(B)

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
| | | |

ELECTRONIC DEVICE AND DRIVE CONTROL METHOD

CROSS-REFERENCE TO RELATED APPLICATION

This patent application is based upon and claims the benefit of priority of the prior Japanese Patent Application No. 2015-006988 filed on Jan. 16, 2015, the entire contents of which are incorporated herein by reference.

FIELD

The embodiment discussed herein is related to an electronic device and a drive control method.

BACKGROUND

There has been a tactile sensation producing apparatus which includes a display, a contact detector that detects a contact state of a user's manipulating operation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used for generating the haptic vibration. The tactile sensation producing apparatus further includes an ultrasound modulating means which performs a modulating process on the waveform data by utilizing an ultrasound as a carrier wave and outputs an ultrasound signal generated by the modulating process to the haptic vibration generating means as a signal used for generating the haptic vibration.

The ultrasound modulating means performs either a frequency modulation or a phase modulation. The ultrasound modulating means further performs an amplitude modulation.

However, a ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus cannot provide a fine or crisp tactile sensation to the user.

RELATED-ART DOCUMENTS

Patent Documents

[Patent Document 1] Japanese Laid-open Patent Publication No. 2010-231609

SUMMARY

According to an aspect of the present application, there is provided an electronic device that includes a top panel having a manipulation input surface, a position detector detecting a position of a manipulation input performed on the manipulation input surface, a vibrating element generating a vibration in the manipulation input surface; and a drive control part being configured to drive the vibrating element by using a driving signal causing the vibrating element to generate a natural vibration in an ultrasound-frequency-band in the manipulation input surface, the drive control part being configured to drive the vibrating element so as to vary an intensity of the natural vibration in accordance with the position of the manipulation input performed onto the manipulation input surface and a temporal change degree of the position, wherein a thickness of the top panel is set that makes a wavelength of a standing wave generated on the top panel by the natural vibration shorter than a wavelength of a ultrasound wave in the air at a frequency of the driving signal.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 13 is a diagram illustrating a first data and a second data stored in a memory;

DESCRIPTION OF EMBODIMENT

Hereinafter, an embodiment to which an electronic device and a drive control method of the present invention are applied will be described.

<Embodiment>

Figure 1:
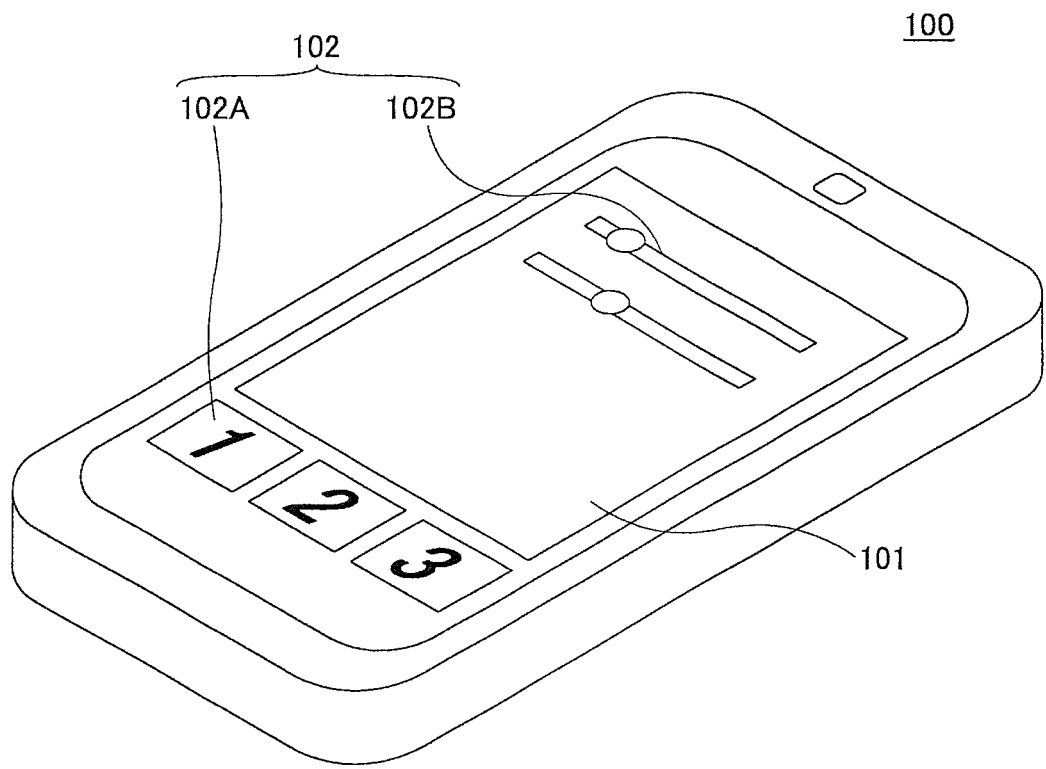
FIG. 1 is a diagram illustrating an electronic device according to an embodiment in perspective view.

FIG. 1 is a diagram illustrating an electronic device 100 according to the embodiment in perspective view.

The electronic device 100 is a smart phone or a tablet computer that includes a touch panel as a manipulation input part, for example. The electronic device 100 may be any device as long as the device includes a touch panel as a manipulation input part. Accordingly, the electronic device 100 may be a device such as a mobile information terminal device, an Automatic Teller Machine (ATM) placed at a specific location or the like, for example.

In a manipulation input part 101 of the electronic device 100, a display panel is disposed under a touch panel, and a button 102A, a slider 102B or the like (hereinafter referred to as Graphic User Interface (GUI) input part(s) 102) are displayed on the display panel.

A user of the electronic device 100 touches the manipulation input part 101 in order to manipulate (operate) the GUI input part 102 with a fingertip under normal conditions.

Hereinafter, a detailed configuration of the electronic device 100 will be described with reference to FIG. 2.

Figure 2:
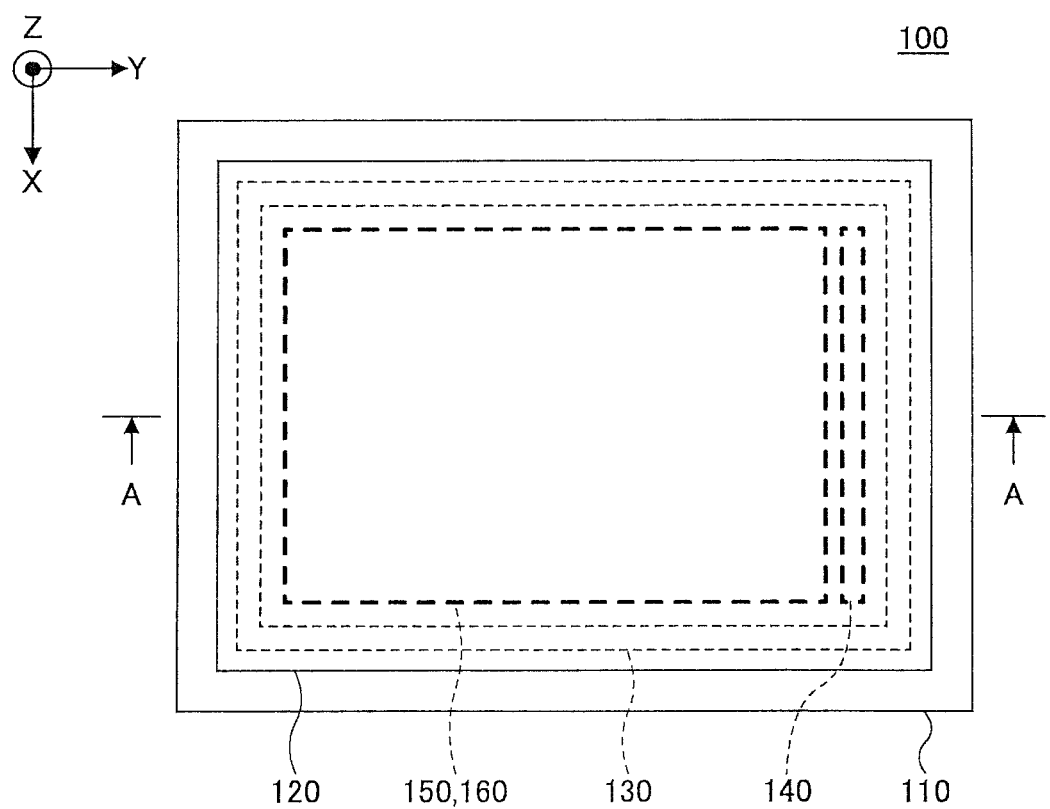
FIG. 2 is a diagram illustrating the electronic device of the embodiment in plan view.
Figure 3:
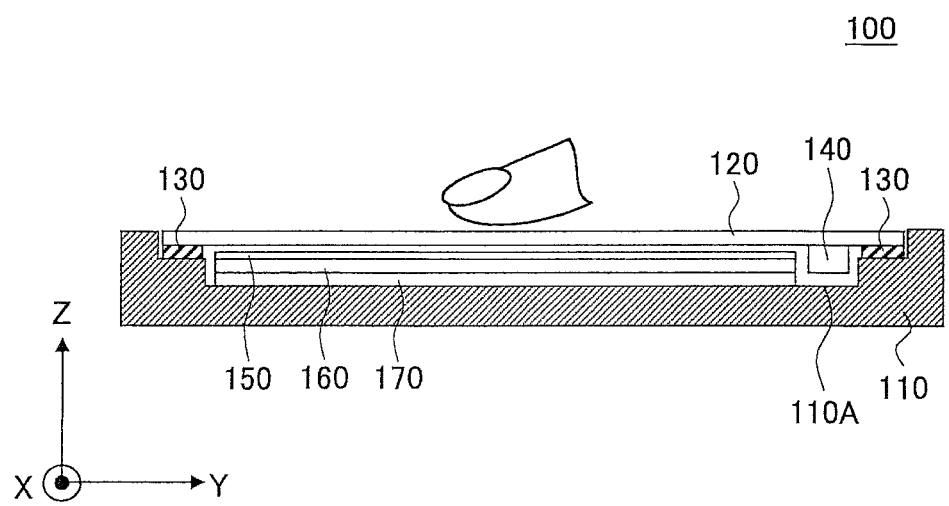
FIG. 3 is a diagram illustrating a cross-sectional view of the electronic device taken along a line A-A of FIG. 2.

FIG. 2 is a diagram illustrating the electronic device 100 of the embodiment in plan view. FIG. 3 is a diagram illustrating a cross-sectional view of the electronic device 100 taken along a line A-A of FIG. 2. An XYZ coordinate system as an orthogonal coordinate system is defined in FIGS. 2 and 3.

The electronic device 100 includes a housing 110, a top panel 120, a double-faced adhesive tape 130, a vibrating element 140, a touch panel 150, a display panel 160 and a substrate 170.

The housing 110 is made of a plastic, for example. As illustrated in FIG. 3, the substrate 170, the display panel 160 and the touch panel 150 are contained in a concave portion 110A of the housing 110, and a top panel 120 is adhered onto the housing 110 by the double-faced adhesive tape 130.

The top panel 120 is a plate-shaped member having a rectangular shape in plan view and is made of a transparent glass or a plastic such as polycarbonate. A surface of the top panel 120 which is located on a positive side in Z axis direction is one example of a manipulation input surface into which the user of the electronic device 100 performs a manipulation input.

The vibrating element 140 is bonded on a surface of the top panel 120 which is located on a negative side in Z axis direction, and the top panel 120 is adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four corners of the top panel 120 to the housing 110.

The touch panel 150 is disposed on the negative side in Z axis direction of the top panel 120. The top panel 120 is provided for the sake of protecting the surface of the touch panel 150. Another panel, protection film or the like may be provided onto the surface of the top panel 120.

In a state where the vibrating element 140 is bonded onto the surface of the top panel 120 located on the negative side in Z axis direction, the top panel 120 vibrates if the vibrating element 140 is being driven. In the embodiment, a standing wave is generated in the top panel 120 by causing the top panel 120 to vibrate at a natural vibration frequency (natural resonance frequency or eigenfrequency) of the top panel 120. Since the vibrating element 140 is bonded to the top panel 120, it is preferable to determine the natural vibration frequency in consideration of a weight of the vibrating element 140 or the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration at an ultrasound-frequency-band. A piezoelectric element such as a piezo element is used as the vibrating element 140, for example.

The vibrating element 140 is driven in accordance with a driving signal output from the drive control part which will be described later. An amplitude (intensity) and a frequency of the vibration output from the vibrating element 140 is set (determined) by the driving signal. An on/off action of the vibrating element 140 is controlled in accordance with the driving signal.

The ultrasound-frequency-band is a frequency band which is higher than or equal to about 20 kHz, for example. According to the electronic device 100 of the embodiment, the frequency at which the vibrating element 140 vibrates is equal to a number of vibrations per unit time (frequency) of the top panel 120. Accordingly, the vibrating element 140 is driven in accordance with the driving signal so that the vibrating element 140 vibrates at a number of natural vibrations per unit time (natural vibration frequency) of the top panel 120.

The touch panel 150 is disposed on upper side (positive side in Z axis direction) of the display panel 160 and is disposed on lower side (negative side in Z axis direction) of the top panel 120. The touch panel 150 is one example of a coordinate detector which detects a position at which the user of the electronic device 100 touches the top panel 120. Hereinafter, the position is referred to as a position of the manipulation input.

The display panel 160 disposed under the touch panel 150 displays various GUI buttons or the like. Hereinafter, the various GUI buttons or the like are referred to as a GUI input part. The user of the electronic device 100 ordinarily touches the top panel 120 with a fingertip in order to manipulate (operate) the GUI input part.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is the capacitance type, the touch panel 150 can detect the manipulation input performed onto the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is a resistive type, the touch panel 150 may be disposed on the top panel 120. In this case, the surface of the touch panel 150 constitutes the manipulation input surface. In a case where the touch panel 150 is the resistive type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The display panel 160 is a display part which displays a picture image. The display panel 160 may be a liquid crystal display panel, an organic Electroluminescence (EL) panel or the like, for example. The display panel 160 is disposed in the concave portion 110A of the housing 110 and is disposed on (the positive side in Z axis direction of) the substrate 170.

The display panel 160 is driven by a driver Integrated Circuit (IC) and displays the GUI input part, the picture image, characters, symbols, graphics or the like in accordance with an operating state of the electronic device 100.

The substrate 170 is disposed in the concave portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive control apparatus which will be described hereinafter and circuits or the like that are necessary for driving the electronic device 100 are mounted.

In the electronic device 100 having the configuration as described above, when the user touches the top panel 120 with the fingertip and a movement of the fingertip is detected, the drive control part mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The electronic device 100 generates the standing wave in the ultrasound-frequency-band in the top panel 120 and provides a tactile sensation (haptic sensation) to the user through the top panel 120.

Next, the standing wave generated in the top panel 120 is described with reference to FIG. 4.

Figure 4:
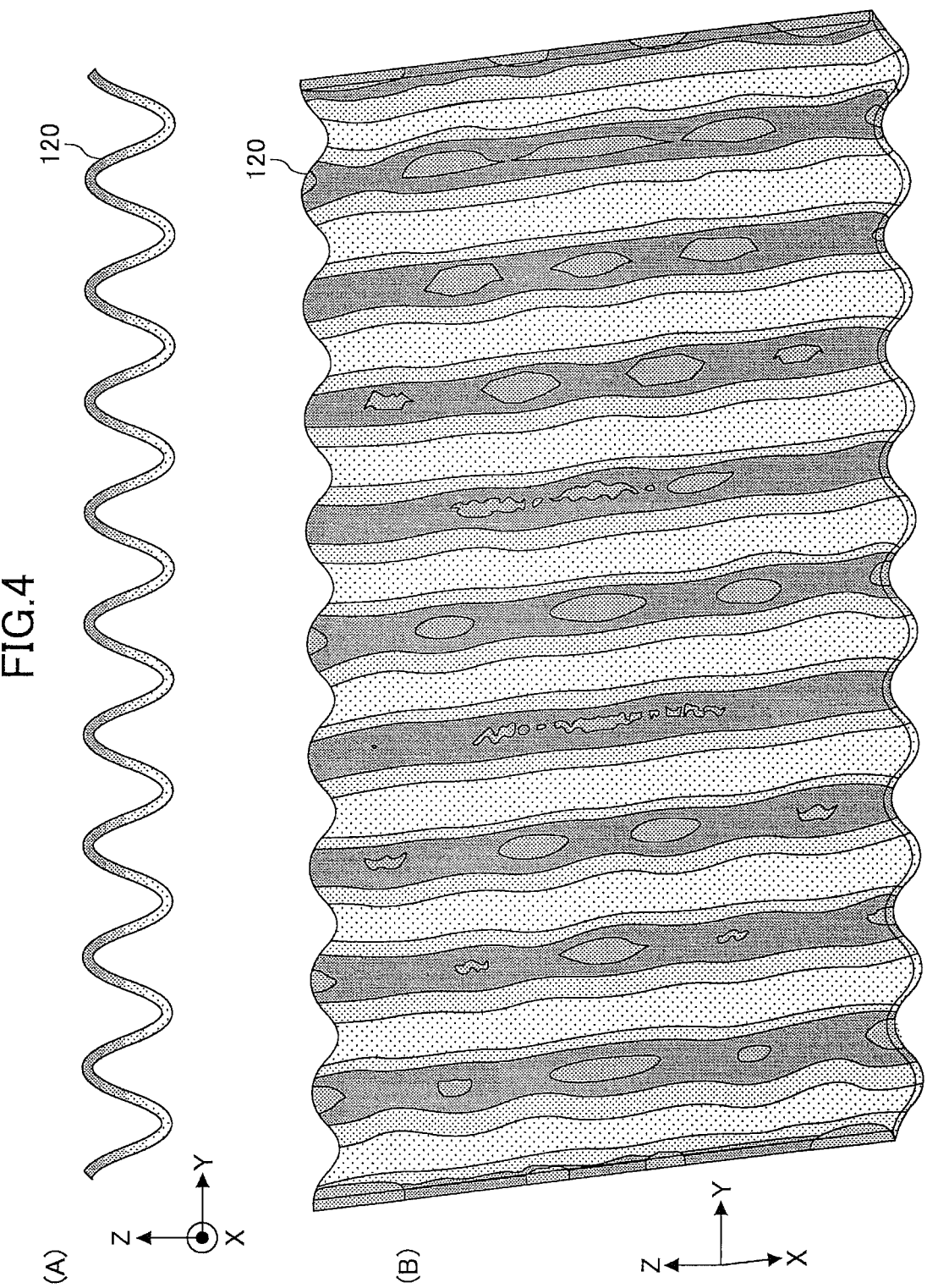
FIG. 4 is a diagram illustrating crests and troughs of a standing wave formed in parallel with the short side of a top panel.

FIG. 4 is a diagram illustrating crests and troughs of the standing wave formed in parallel with the short side of the top panel 120 included in the standing waves generated in the top panel 120 by the natural vibration at the ultrasound-frequency-band. A part (A) of FIG. 4 illustrates a side view, and a part (B) of FIG. 4 illustrates a perspective view. In parts (A) and (B) of FIG. 4, a XYZ coordinate system similar to that described in FIGS. 2 and 3 is defined. In parts (A) and (B) of FIG. 4, the amplitude of the standing wave is overdrawn in an easy-to-understand manner. The vibrating element 140 is omitted in parts (A) and (B) of FIG. 4.

The natural vibration frequency (the resonance frequency) f of the top panel 120 is represented by formulas (1) and (2) where E is the Young's modulus of the top panel 120, ρ is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Since the standing wave has the same waveforms in every half cycle, the periodic number k takes values at 0.5 intervals. The periodic number k takes 0.5, 1, 1.5, 2 . . . .

$$f = \frac{\pi k^2 t}{l^2} \sqrt{\frac{E}{3\rho(1-\delta^2)}} \tag{1}$$

$$f = \alpha k^2 \tag{2}$$

The coefficient α included in formula (2) corresponds to coefficients other than $k^2$ included in formula (1).

A waveform of the standing wave as illustrated in parts (A) and (B) of FIG. 4 is obtained in a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the driving signal is 33.5 kHz.

The top panel 120 is a planar member. If the vibrating element 140 (see FIGS. 2 and 3) is driven and the natural vibration at the ultrasound-frequency-band is generated in the top panel 120, the top panel 120 is bent as illustrated in parts (A) and (B) of FIG. 4. As a result, the standing wave is generated in the top panel 120.

In the present embodiment, the single vibrating element 140 is bonded on the surface of the top panel 120 which is located on the negative side in Z axis direction at the location along the short side extending in X axis direction at the positive side in Y axis direction. The electronic device 100 may include two vibrating elements 140. In a case where the electronic device 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 are disposed at locations plane symmetry with respect to the top panel 120.

In a case where the electronic device 100 includes two vibrating elements 140, the two vibrating elements 140 are driven in the same phase, if the periodic number k is an integer number. If the periodic number k is a decimal fraction, the two vibrating elements 140 are driven in opposite phases.

Next, the natural vibration at ultrasound-frequency-band generated in the top panel 120 of the electronic device 100 is described with reference to FIG. 5.

Figure 5:
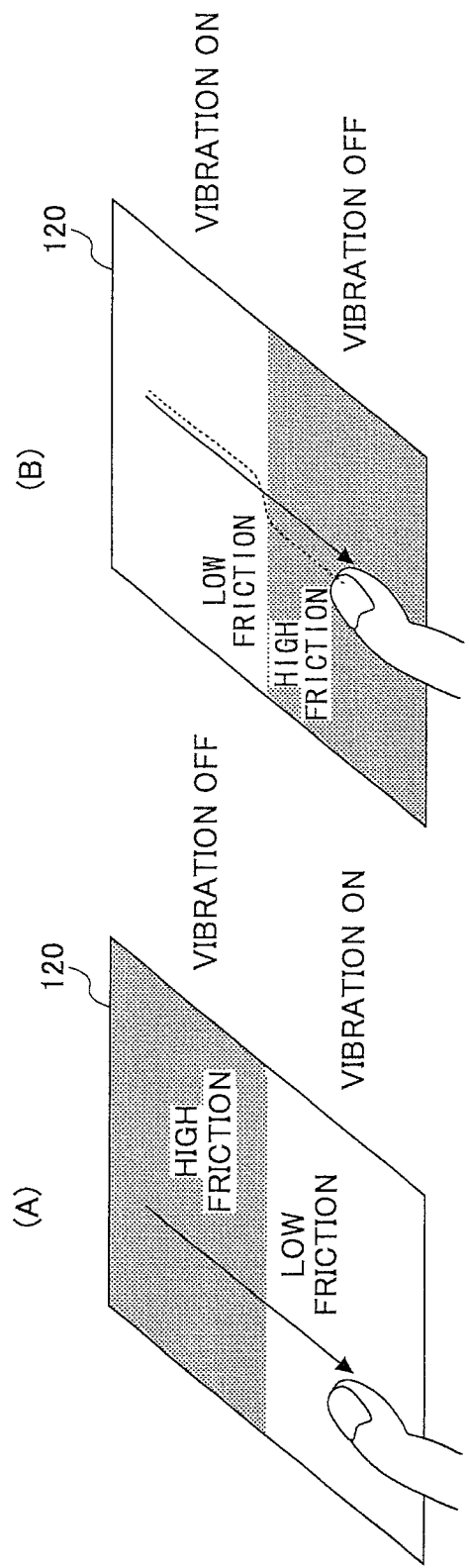
FIG. 5 is a diagram illustrating cases where a kinetic friction force applied to a fingertip varies when the natural vibration at the ultrasound-frequency-band is generated in the top panel of the electronic device.

FIG. 5 is a diagram illustrating cases where a kinetic friction force applied to the fingertip varies when the natural vibration at the ultrasound-frequency-band is generated in the top panel 120 of the electronic device 100. In FIG. 5, the manipulation input is performed with the fingertip. In parts (A) and (B) of FIG. 5, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In parts (A) and (B) of FIG. 5, areas in which the fingertip touches while the vibration is turned off are indicated in grey in the direction from the far side to the near side. Areas in which the fingertip touches while the vibration is turned on are indicated in white in the direction from the far side to the near side.

As illustrated in FIG. 4, the natural vibration at the ultrasound-frequency-band occurs on an entire surface of the top panel 120. Parts (A) and (B) of FIG. 5 illustrate operation patterns in which the on/off state of the natural vibration is switched while the fingertip of the user is tracing the top panel 120 in the direction from the far side to the near side.

Accordingly, in parts (A) and (B) of FIG. 5, the areas in which the fingertip touches while the vibration is turned off are indicated in grey in the direction from the far side to the near side. The areas in which the fingertip touches while the vibration is turned on are indicated in white in the direction from the far side to the near side.

In the operation pattern as illustrated in part (A) of FIG. 5, the vibration is turned off when the fingertip of the user is located on the far side of the top panel 120, and the vibration is turned on in the process of tracing the top panel 120 with the fingertip toward the near side.

On the contrary, in the operation pattern as illustrated in part (B) of FIG. 5, the vibration is turned on when the fingertip of the user is located on the far side of the top panel 120, and the vibration is turned off in the process of tracing the top panel 120 with the fingertip toward the near side.

In a state where the natural vibration at the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in part (A) of FIG. 5, the kinetic friction force applied to the fingertip becomes larger. In the white area located on the near side of the top panel 120, the kinetic friction force applied to the fingertip becomes smaller.

Therefore, the user who is performing the manipulation input to the top panel 120 in a manner as illustrated in part (A) of FIG. 5 senses a reduction of the kinetic friction force applied to the fingertip when the vibration is turned on. As a result, the user senses a slippery or smooth touch (texture) with the fingertip. In this case, the user senses as if a concave portion is provided on the surface of the top panel 120 when the surface of the top panel 120 becomes slippery and the kinetic friction force becomes lower.

On the contrary, in the white area located on the far side of the top panel 120 as illustrated in part (B) of FIG. 5, the kinetic friction force applied to the fingertip becomes smaller. In the grey area located on the near side of the top panel 120, the kinetic friction force applied to the fingertip becomes higher.

Therefore, the user who is performing the manipulation input in the top panel 120 in a manner as illustrated in part (B) of FIG. 5 senses an increase of the kinetic friction force applied to the fingertip when the vibration is turned off. As a result, the user senses a grippy or scratchy touch (texture) with the fingertip. In this case, the user senses as if a convex portion is provided on the surface of the top panel 120 when the surface of the top panel 120 becomes grippy and the kinetic friction force becomes higher.

Accordingly, the user can sense a concavity or convexity with the fingertip in cases as illustrated in parts (A) and (B) of FIG. 5. For example, "The Printed-matter Typecasting Method for Haptic Feel Design and Sticky-band Illusion" (The collection of papers of the 11$^{th}$ SICE system integration division annual conference (SI2010, Sendai)_174-177, 2010-12) discloses that a human can sense a concavity or a convexity. "Fishbone Tactile Illusion" (Collection of papers of the 10th Congress of The Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

Next, ultrasound waves radiated from the top panel 120 are described with reference to FIG. 6.

Figure 6:
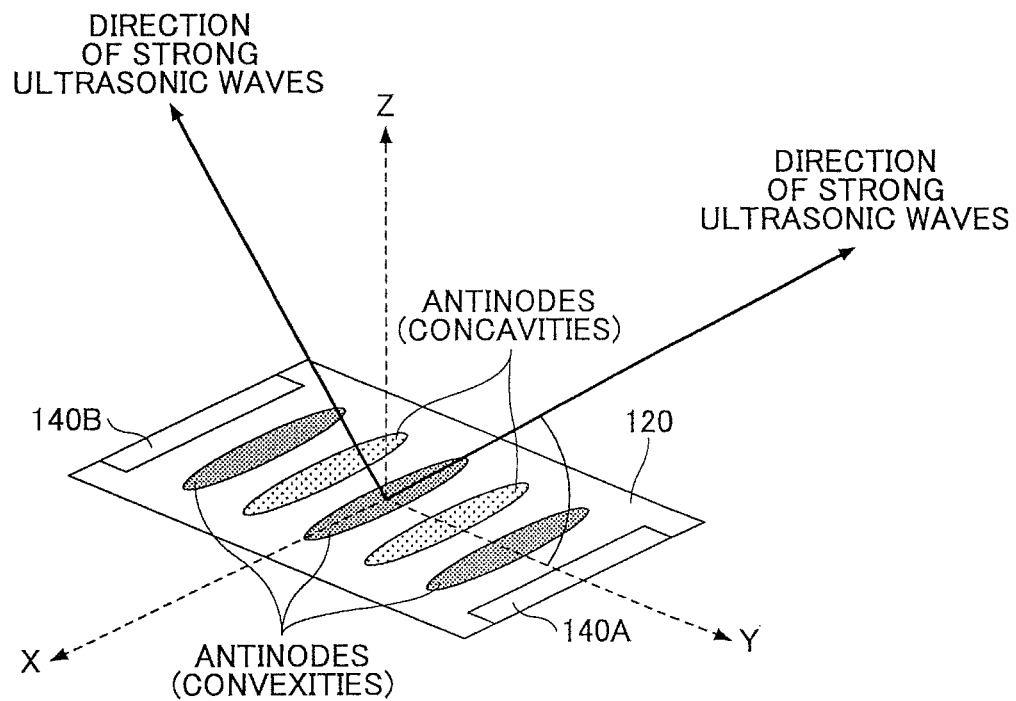
FIG. 6 is a diagram illustrating a top panel radiating ultrasound waves.

FIG. 6 illustrates the top panel 120 radiating the ultrasound waves. In FIG. 6, a XYZ coordinate system similar to that described in FIGS. 2 to 4 is defined.

Herein, vibrating elements 140A and 140B are attached to the top panel 120. The vibrating element 140A is similar to the vibrating element 140 illustrated in FIGS. 2 and 3. The vibrating element 140B is bonded onto the surface of the top panel 120 located on the negative side in Z axis direction at a location along the short side extending in X axis direction at a negative side in Y axis direction. In other words, the vibrating element 140B is located along an opposite side of the top panel 120 which is opposite to the side along which the vibrating element 140A is located.

The vibrating elements 140A and 140B are driven in coordinate phase (the same phase). At a certain moment, convex antinodes indicated in dark gray and concave antinodes indicated in light gray occur on the top panel 120. The convex antinodes indicated in dark gray and the concave antinodes indicated in light gray have the maximum amplitudes at the moment.

At a certain moment which is a half cycle of the natural vibration of the standing wave different from the moment as described above, concave antinodes with the maximum amplitude occur at locations of the convex antinodes indicated in dark gray in FIG. 6, and convex antinodes with maximum amplitude occur at locations of the concave antinodes indicated in light gray in FIG. 6.

The antinodes of the standing wave cause the air to vibrate. As a result, the ultrasound waves are radiated from the top panel 120. It was experimentally found that the ultrasound waves are radiated from the top panel 120 strongly in a direction having an angle with respect to the Y axis and the Z axis in YZ plane.

Figure 7:
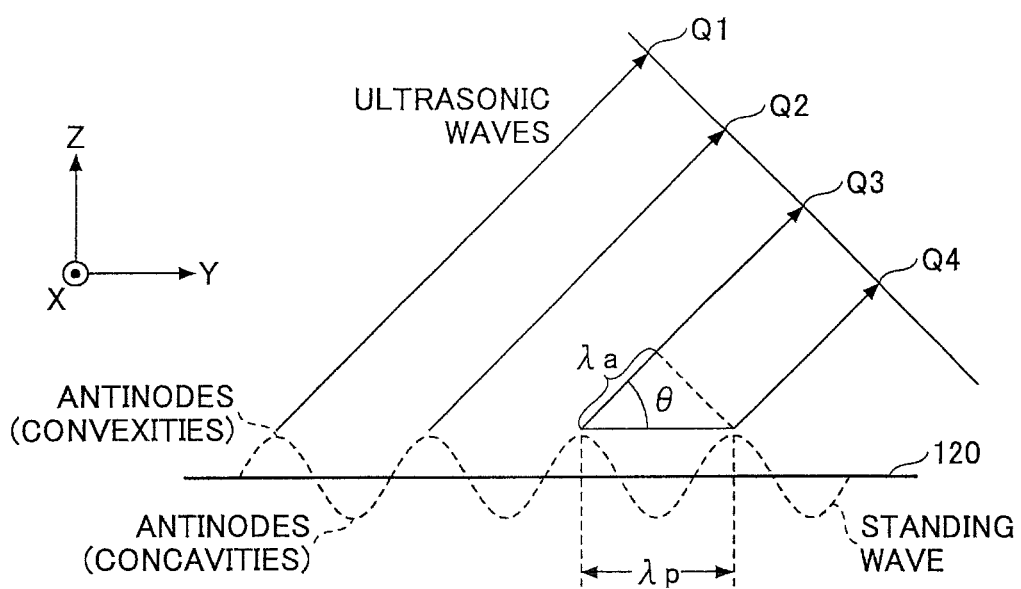
FIG. 7 is a diagram illustrating a standing wave of the top panel and the ultrasound waves radiated from the surface of the top panel.

FIG. 7 illustrates the standing wave of the top panel 120 and the ultrasound waves radiated from the surface of the top panel 120 in cross-sectional view parallel to the YZ plane. In FIG. 7, the vibrating elements 140A and 140B are omitted.

The surface of the top panel 120 is flat as indicated by a solid line in a state where the vibrating elements 140A and 140B are not being driven. The standing wave as indicated by a dashed line is generated on the surface of the top panel 120 in a state where the vibrating elements 140A and 140B are driven by the driving signal which causes the vibrating elements 140A and 140B to generate the natural vibration in the ultrasound-frequency-band on the top panel 120. In FIG. 7, four convex antinodes and four concave antinodes are illustrated.

An angle θ (elevation angle) between the direction in which the ultrasound waves are radiated strongly and the surface of the top panel 120 indicated by the solid line satisfies a following formula (3), where λp represents a wavelength of the standing wave generated on the top panel 120, and λa represents a wavelength of the ultrasound waves at a frequency of the driving signal in the ultrasound-frequency-band. The λa represents the wavelength in the air.

$$\cos θ = λa/λp \quad (3)$$

The reason why the strong ultrasound waves are radiated in the direction satisfying formula (3) is as follows. Since the vibration of the standing wave of the top panel 120 has a spatial cyclic pattern as illustrated in FIG. 7 and the maximum amplitude of the standing wave is obtained at the antinodes, the vibrations of the ultrasound waves generated in the air by the standing wave overlap with each other in a particular direction.

Accordingly, it is considered that the ultrasound waves generated in the air by the standing wave strengthen with each other in the direction of the angle θ satisfying formula (3). In particular, the ultrasound waves strengthen with each other at points Q1, Q2, Q3 and Q4 as illustrated in FIG. 7. It was confirmed that ultrasound waves experimentally detected in the air had directionality (directional characteristics) that was almost equal to that of angle θ satisfying formula (3).

In the electronic device 100, in order to suppress radiation of the vibrations of the ultrasound waves generated in the air by the standing wave of the natural vibration in the ultrasound-frequency-band or in order to reduce intensity of the ultrasound waves, the top panel 120 is designed so that a condition in which the angle θ satisfying formula (3) does not exist can be obtained.

Formula (3) represents relationship between the wavelength λp of the standing wave and the wavelength λa of the ultrasound waves in the air by cosine (cos). Accordingly, formula (3) is not satisfied, if the wavelength λa becomes longer than the wavelength λp, i.e. λp<λa is established.

By using propagation velocities of the standing wave and the ultrasound waves in the air, λp<λa is represented as following formula (4). Vp represents the propagation velocity of the standing wave generated on the top panel 120, and Va represents the propagation velocity of the ultrasound waves in the air. The propagation velocity Va is a propagation velocity of the ultrasound waves radiated in the air by the standing wave of the natural vibration in the ultrasound-frequency-band generated on the top panel 120. Herein, the propagation velocity Va of the ultrasound waves in the air is almost equal to a propagation velocity of sound waves in an audible-frequency-band (less than 20 KHz) in the air. Accordingly, the propagation velocity Va is about 340 m/s. The propagation velocity Va varies depending on environmental conditions such as temperature.

$$Vp<Va \quad (4)$$

Since the vibration of the top panel 120 generated for the sake of obtaining the squeeze film effect is bending vibration (i.e., flexural vibration), the propagation velocity Vp can be expressed as following formula (5) by utilizing a theory of beam vibration.

Herein, f represents frequency of the natural vibration in the ultrasound-frequency-band generated on the top panel 120, t represents thickness of the top panel 120, E represents Young's modulus of the top panel 120 and ρ represents the density of the top panel 120.

Herein, formula (1) represents bending vibration (i.e., flexural vibration) of a board extending in directions of X axis and Y axis. In formula (1), the bending vibration obtained by the theory of the beam vibration is assumed to be constant in X axis direction. A propagation velocity derived from formula (1) indicates dependence properties with respect to the thickness t, Young's modulus E or the like in a manner similar to formula (5).

$$Vp=(2πft)^{1/2}×(E/12ρ)^{1/4} \quad (5)$$

As indicated in formula (5), the propagation velocity Vp is proportional to square root of the thickness t. It is possible to satisfy conditions defined by formula (4) by decreasing the thickness t.

It was experimentally confirmed that the ultrasound waves radiated from the top panel 120 satisfying formula (4) was reduced by about 10 dB and that it was possible to suppress the radiation of the ultrasound waves in the air. The intensities of the ultrasound waves were reduced.

Moreover, it was experimentally confirmed that the relatively week ultrasound waves were radiated in the small angle θ even in a case of Va<Vp. In the following, an embodiment in which the radiation of the ultrasound waves is suppressed more effectively will be explained with reference to FIGS. 8 to 11.

Figure 8:
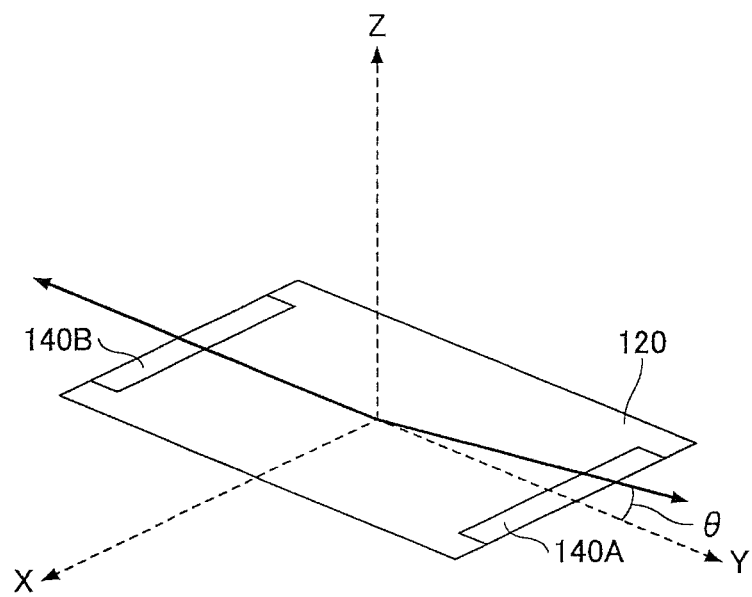
FIG. 8 is a diagram illustrating a propagation direction of the ultrasound waves radiated from the surface of the top panel 120 in the air.

FIG. 8 illustrates a propagation direction of the ultrasound waves radiated from the surface of the top panel 120 in the air. As illustrated in FIG. 8, the angle θ is defined between the surface of the top panel 120 and the propagation direction of the ultrasound waves. The angle θ illustrated in FIG. 8 is the same as the angle θ illustrated in FIG. 7.

The intensity of the ultrasound waves becomes larger in a case where the angle θ is relatively small. The larger the angle θ becomes, the smaller the intensity of the ultrasound waves becomes.

A distribution of the direction in which the ultrasound waves are radiated from the surface of the top panel 120 was analyzed by utilizing finite element analysis under a condition satisfying formula (4). As a result, a distribution of the angle θ as illustrated in FIG. 9 was obtained.

Figure 9:
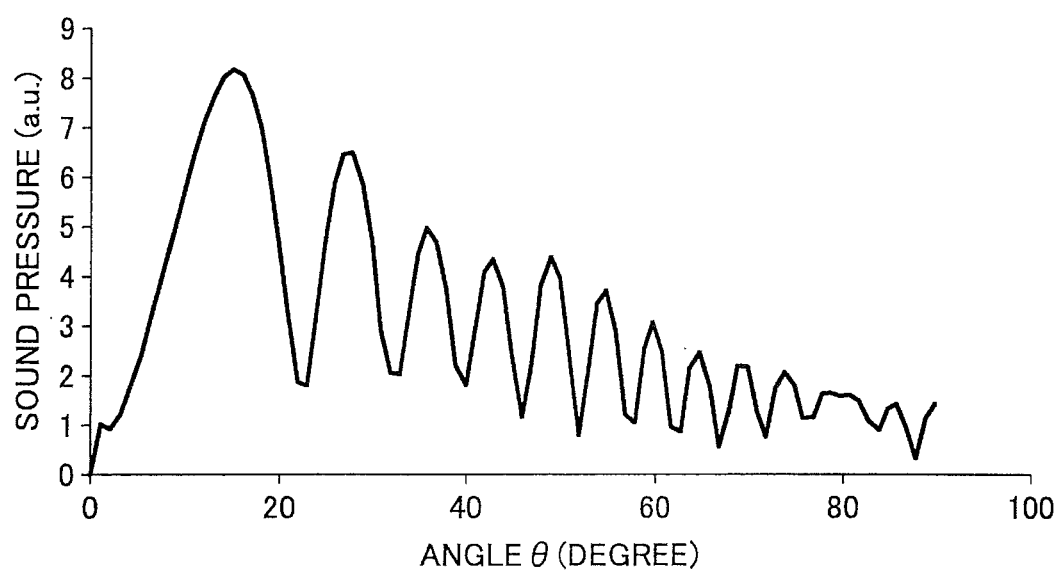
FIG. 9 is a diagram illustrating sound pressure distribution with respect to angle θ.

FIG. 9 illustrates sound pressure distribution with respect to the angle θ. The distribution as illustrated in FIG. 9 are obtained by simulation utilizing finite element analysis. Unit of the angle θ indicated in a horizontal axis is degree, and the sound pressure is indicated in a vertical axis with arbitrary unit (a.u.). The sound pressure represents level of the vibration of the ultrasound waves.

The analysis was performed, varying a ratio of the wavelength λa to the wavelength λp (λa/λp). It was experimentally confirmed that positions of peaks of the sound pressure varied corresponding to the ratio λa/λp and that the propety (envelope of distribution) was kept that the smaller the angle θ became, the higher the peaks of the sound pressure became. The maximum peak sound pressure existed between 0 degrees and about 20 degrees.

Accordingly, it is possible to suppress the radiation of the ultrasound waves from the surface of the top panel 120 by setting the thickness of the top panel 120 so that the wavelength λp becomes shorter than the wavelength λa.

Moreover, it is possible to suppress the radiation of the ultrasound waves from the surface of the top panel 120 by using a wall which reflects or shields the ultrasound waves radiating in a direction having the angle θ less than or equal to 20 degrees. Further, it is possible to suppress the intensity of the ultrasound waves in the air by using the wall.

Figure 10:
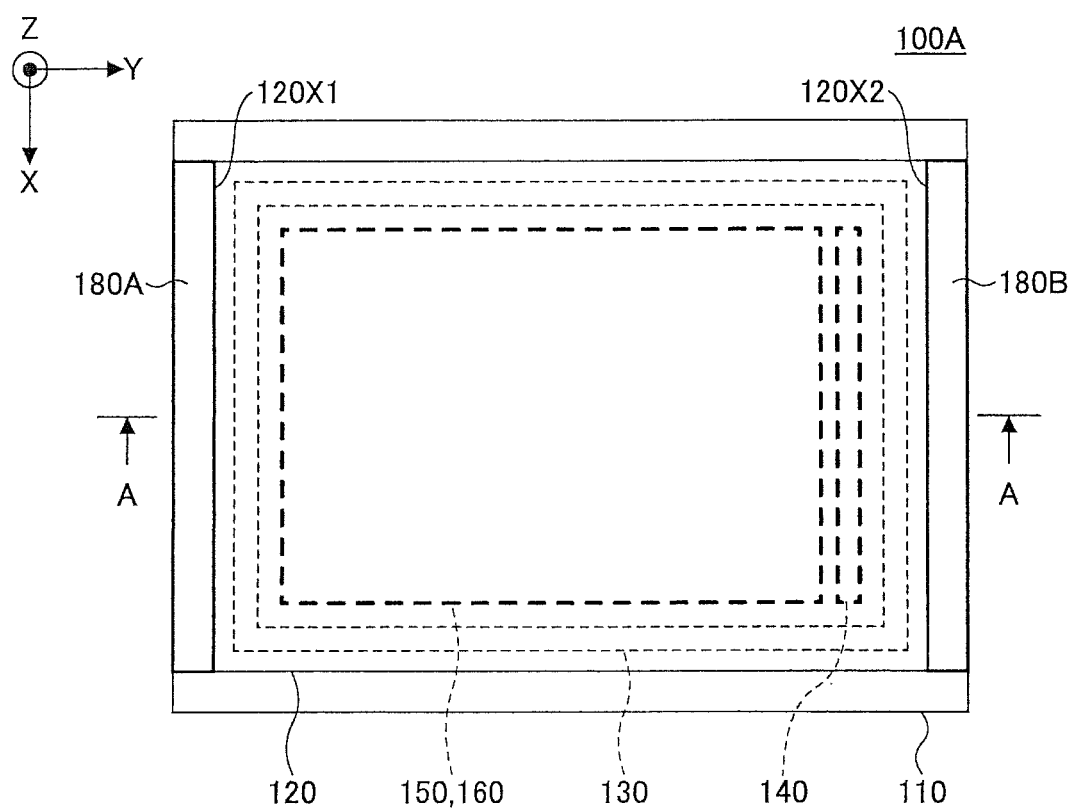
FIG. 10 is a diagram illustrating an electronic device according to a first variation example of the embodiment in plan view.
Figure 11:
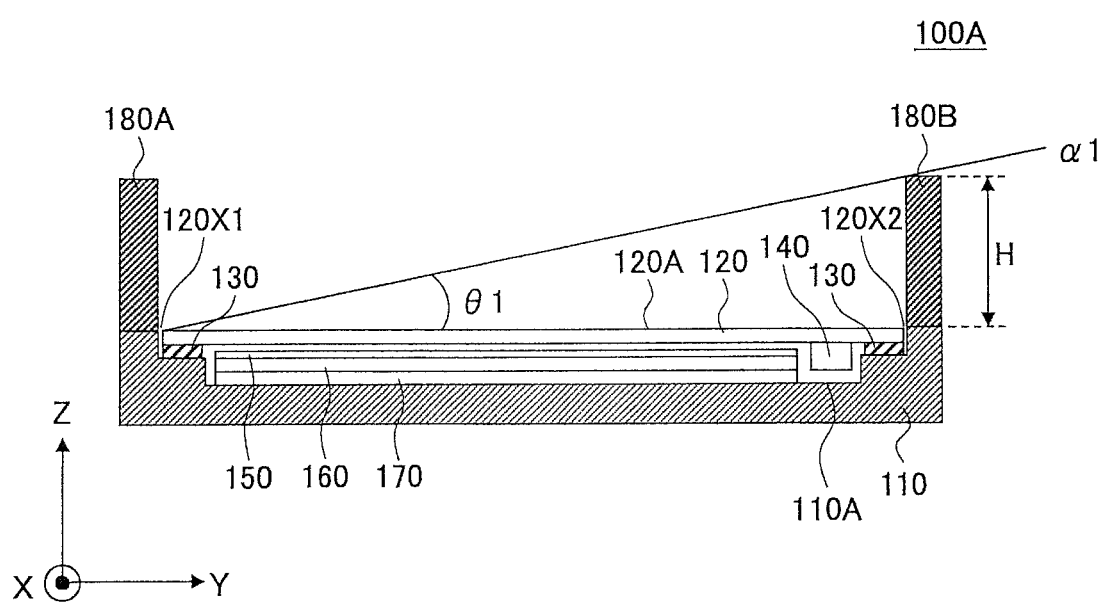
FIG. 11 is a diagram illustrating the electronic device in cross-sectional view.

FIG. 10 illustrates an electronic device 100A according to a first variation example of the embodiment in plan view. FIG. 11 illustrates the electronic device 100A in cross-sectional view.

The electronic device 100A has a configuratuion in which walls 180A and 180B are added to the configuration of the electronic device 100 as illustrated in FIGS. 1 to 3. FIGS. 10 and 11 illustate the plan view and cross-sectional view corresponding to those illustrated in FIGS. 2 and 3, respectively.

The wall 180A is provided on the housing 110. The wall 180A extends in X axis direction along the short side 120X1 extending in X axis direction at the end portion located on negative side in Y axis direction of the top panel 120. The wall 180A also extends in positive Z axis direction. Width of the wall 180A in X axis direction is the same as the width of the top panel 120 in X axis direction. Positions of both ends of the wall 180A in X axis direction are aligned with both ends of the top panel 120 in X axis direction. The short side 120X1 is one of four side edges of the top panel 120. The short side 120X1 extends in X axis direction and is located at the end portion of the top panel 120 on negative side in Y axis direction.

The wall 180B is provided on the housing 110. The wall 180B extends in X axis direction along the short side 120X2 extending in X axis direction at the end portion located on positive side in Y axis direction of the top panel 120. The wall 180B also extends in positive Z axis direction. Width of the wall 180B in X axis direction is the same as the width of the top panel 120 in X axis direction. Positions of both ends of the wall 180B in X axis direction are aligned with both ends of the top panel 120 in X axis direction. The short side 120X2 is one of the four side edges of the top panel 120. The short side 120X2 extends in X axis direction and is located at the end portion of the top panel 120 on positive side in Y axis direction.

The walls 180A and 180B are cuboid members that have longitudinal directions in X axis direction and are made of plastic, rubber or the like, for example. It is possible to reflect or weaken the ultrasound waves by the walls 180A and 180B made of plastic, rubber or the like. The reflected ultrasound waves weaken with each other. Accordingly, it is possible to suppress radiation of the ultrasound waves The walls 180A and 180B may be a porous member such as a sponge. It becomes possible to absorb the ultrasound waves by the walls 180A and 180B and to enhance suppressing effect of the radiation of the ultrasound waves. In this case, the ultrasound waves are shielded by the walls 180A and 180B.

In the electronic device 100A, the nodes and the antinodes of the standing wave are generated parallel to the short sides 120X1 and 120X2 of the top panel 120. Therefore, the walls 180A and 180B are disposed parallel to X axis at the end portion on negative side in Y axis direction and at the end portion on positive side in Y axis direction of the top panel 120, respectively. This is for the sake of effectively reflecting or shielding the ultrasound waves radiated in Y axis direction.

The walls 180A and 180B are examples of a first wall and a second wall, respectively. Herein, one or two wall(s) extending in Y axis direction may be added between the walls 180A and 180B. The walls 180A and 180B and the two walls may form a rectangular ring-like shaped wall in plan view. In this case, two sides extending in X axis direction among the rectangular ring-like shaped wall are examples of the first wall and the second wall.

The walls 180A and 180B may be formed with the housing 110 in an integrated fashion. The widths of the walls 180A and 180B in Y axis direction may be thinner than the widths illustrated in FIG. 11. In this case, a positive-side-surface of the wall 180A in Y axis direction may be offset on negative side in Y axis direction compared with the position as illustrated in FIG. 11, and a negative-side-surface of the wall 180A in Y axis direction may be offset on positive side in Y axis direction compared with the position as illustrated in FIG. 11. Moreover, a negative-side-surface of the wall 180B in Y axis direction may be offset on positive side in Y axis direction compared with the position as illustrated in FIG. 11, and a positive-side-surface of the wall 180B in Y axis direction may be offset on negative side in Y axis direction compared with the position as illustrated in FIG. 11.

Height of the walls 180A and 180B in Z axis direction are equal to each other. In the following, the height of the wall 180B will be explained. Line α1 is extending from the short side 120X1 to the top portion of the wall 180B as viewed in the cross-section parallel to YZ plane. Elevation angle of the line α1 with respect to the surface 120A of the top panel 120 in the cross-section is the angle θ1. The height of the wall 180B is designed so that the angle θ1 becomes 20 degrees.

Since the short side 120X2 of the top panel 120 is located adjacent to the wall 180B in Y axis direction, the height H of the wall 180B is expressed as following formula (6) where L represents length of the top panel 120 in Y axis direction.

$$H = L \times \tan \theta 1 \quad (6)$$

As described above, the short side 120X2 of the top panel 120 is located adjacent to the wall 180B in Y axis direction. Accordingly, it is possible to calculate the height H of the wall 180B based on formula (6) which includes the length L of the top panel 120 in Y axis direction. Since the length L of the top panel 120 in Y axis direction is almost the same as length between the negative-side-surface of the wall 180B in Y axis direction and the short side 120X1, it is possible to use the length L in formula (6).

In a case where the negative side surface of the wall 180B in Y axis direction is offset on positive side in Y axis direction compared with the position as illustrated in FIG. 11, the height H of the wall 180B can be calculated by multiplying tangent θ1 to length between the short side 120X1 and the negative-side-surface of the wall 180B in Y axis direction.

For example, the height H of the wall 180B adjacent to the top panel 120 is calculated by formula (6) as 55 mm, where the length L of the top panel 120 in Y axis direction is 150 mm.

The height H of the wall 180B may be calculated by multiplying tangent θ1 to length between the negative-side-surface of the wall 180B in Y axis direction and an antinode closest to the the wall 180A among the antinodes generated on the top panel 120.

In the following, a configuration of the electronic device 100 according to the embodiment is described with reference to FIG. 12.

Figure 12:
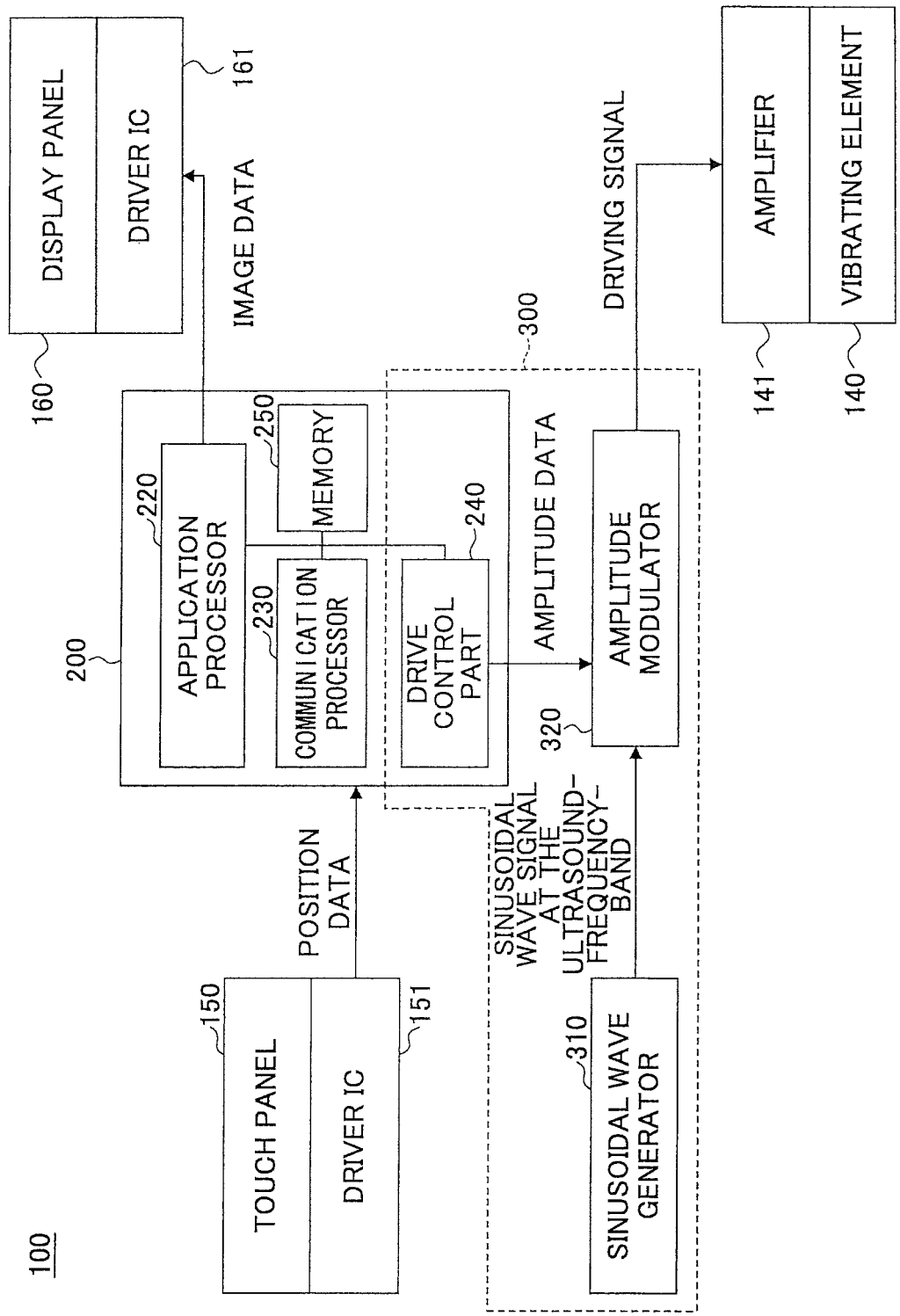
FIG. 12 is a diagram illustrating the configuration of the electronic device according to the embodiment.

FIG. 12 is a diagram illustrating the configuration of the electronic device 100 according to the embodiment.

The electronic device 100 includes the vibrating element 140, an amplifier 141, the touch panel 150, a driver Integrated Circuit (IC) 151, the display panel 160, a driver IC 161, a controller 200, a sinusoidal wave generator 310 and a amplitude modulator 320.

The controller 200 includes an application processor 220, a communication processor 230, a drive control part 240 and a memory 250. The controller 200 is realized by an IC chip, for example.

The drive control part 240, the sinusoidal wave generator 310 and the amplitude modulator 320 constitute a drive control apparatus 300. Although an embodiment in which the application processor 220, the communication processor 230, the drive control part 240 and the memory 250 are included in the single controller 200 is described, the drive control part 240 may be disposed outside of the controller 200 and realized by another IC chip or a processor. In this case, data which is necessary for a drive control performed by the drive control part 240 among data stored in the memory 250 may be stored in another memory disposed in the drive control apparatus 300.

In FIG. 12, the housing 110, the top panel 120, the double-faced adhesive tape 130 and the substrate 170 (see FIG. 2) are omitted. Herein, the amplifier 141, the driver IC 151, the driver IC 161, the drive control part 240, the memory 250, the sinusoidal wave generator 310 and the amplitude modulator 320 are described.

The amplifier 141 is disposed between the drive control apparatus 300 and the vibrating element 140. The amplifier 141 amplifies the driving signal output from the drive control apparatus 300 and drives the vibrating element 140.

The driver IC 151 is connected to the touch panel 150. The driver IC 151 detects position data representing the position on the touch panel 150 at which the manipulation input is performed and outputs the position data to the controller 200. As a result, the position data is input to the application processor 220 and the drive control part 240. Inputting the position data to the drive control part 240 is equal to inputting the position data to the drive control apparatus 300.

The driver IC 161 is connected to the display panel 160. The driver IC 161 inputs image data output from the drive control apparatus 300 to the display panel 160 and displays a picture image on the display panel 160 based on the image data. Accordingly, the GUI input part, the picture image and the like are displayed on the display panel 160 based on the image data.

The application processor 220 executes various application programs included in the electronic device 100.

The communication processor 230 performs processes that are necessary for communications of 3rd Generation (3G), 4th Generation (4G), Long Term Evolution (LTE), WiFi or the like of the electronic device 100.

The drive control part 240 outputs an amplitude data to the amplitude modulator 320 in a case where two designated condition are satisfied. The amplitude data represents an amplitude value used for controlling an intensity of the driving signal used for driving the vibrating element 140. The amplitude value is set in accordance with a temporal change degree of the position data. A moving speed of the user's fingertip tracing along the surface of the top panel 120 is used as the temporal change degree of the position data. The drive control part 240 calculates the moving speed of the user's fingertip based on a temporal change degree of the position data input from the driver IC 151.

The higher the moving speed becomes, the smaller the drive control apparatus 300 controls the amplitude value to be, for the sake of making an intensity of the tactile sensation sensed by the user constant regardless of the moving speed of the fingertip, for example. The lower the moving speed becomes, the greater the drive control apparatus 300 controls the amplitude value to be, for the sake of making the intensity constant regardless of the moving speed of the fingertip, for example.

A first data which represents a relationship between the amplitude data representing the amplitude value and the moving speed is stored in the memory 250.

Although the amplitude value is set in accordance with the moving speed based on the first data in the present embodiment, the amplitude value A may be calculated based on formula (7). The higher the moving speed becomes, the smaller the amplitude value A calculated by formula (7) becomes. The lower the moving speed becomes, the greater the amplitude value A calculated by formula (7) becomes.

$$A = A_0 / \sqrt{|V|/a} \quad (7)$$

"$A_0$" is a reference value of the amplitude, "V" represents the moving speed of the fingertip and "a" is a designated constant value. In a case where the amplitude value A is calculated by using formula (7), data representing formula (7) and data representing the reference value $A_0$ and the designated constant value a may be stored in the memory 250.

The drive control apparatus 300 of the embodiment causes the top panel 120 to vibrate in order to vary the kinetic friction force applied to the user's fingertip when the fingertip traces along the surface of the top panel 120. Since the kinetic friction force occurs when the fingertip is in motion, the drive control part 240 causes the vibrating element 140 to vibrate when the moving speed becomes greater than or equal to a designated threshold speed. A first designated condition is satisfied in a case where the moving speed is greater than or equal to the designated threshold speed.

Accordingly, the amplitude value represented by the amplitude data output from the drive control part 240 becomes zero in a case where the moving speed is less than the designated threshold speed. The amplitude value is set to a designated amplitude value corresponding to the moving speed in a case where the moving speed is greater than or equal to the designated threshold speed. In a case where the moving speed is greater than or equal to the designated threshold speed, the higher the moving speed becomes, the smaller the amplitude value becomes. In a case where the moving speed is greater than or equal to the designated threshold speed, the lower the moving speed becomes, the greater the amplitude value becomes.

In the drive control apparatus 300 of the embodiment, the amplitude data is output to the amplitude modulator 320 in a case where the position of the fingertip performing the manipulation input is in a designated area which requires generating the vibration. A second designated condition is satisfied in a case where the position of the fingertip performing the manipulation input is in the designated area which requires generating the vibration.

The drive control apparatus 300 determines whether the position of the fingertip performing the manipulation input is in the designated area which requires generating the vibration based on whether the position is located in the designated area or not.

Positions of the GUI input parts displayed on the display panel 160, areas in which the picture images are displayed or areas in which entire pages are displayed are identified by area data which represents locations on the display panel 160. The area data is assigned to all the GUI input parts displayed on the display panel 160, all the areas in which the picture images are displayed and all the areas in which entire pages are displayed. The area data is assigned to all the GUI input parts and all the areas that are used in all application programs.

Accordingly, in a case where the drive control apparatus 300 determines, as the second designated condition, whether the position of the fingertip performing the manipulation input is in the designated area which requires generating the vibration, a kind (type) of the application program(s) executed by the electronic device 100 is of concern to the determination. This is because contents displayed on the display panel 160 are different depending on the kinds of the application program (application software).

Further, this is because kinds of the manipulation inputs are different depending on the kind of the application program (application software). The manipulation inputs are performed by tracing the fingertip(s) touching the surface of the top panel 120. There is a so-called flick operation as a kind of the manipulation input performed by tracing the fingertip(s) touching the surface of the top panel 120. The flick operation is performed in order to operate the GUI input part, for example. The flick operation is performed by flicking (snapping) the fingertip along the surface of the top panel 120 for a relatively-short distance.

In a case where the user turns over or flips a page, a swipe operation is performed, for example. The swipe operation is performed by swiping the fingertip along the surface of the top panel 120 for a relatively-long distance. The swipe operation is performed when the user turns over or flips the page or a photo, for example. A drag operation is performed when the user slides the slider (see the slider 102B as illustrated in FIG. 1) which is constituted by the GUI input part.

The manipulation inputs that are performed by tracing the fingertip along the surface of the top panel 120, such as the flick operation, the swipe operation and the drag operation that are introduced as examples, are used differently depending on the kinds of the application programs (software). Accordingly, in a case where the drive control apparatus 300 determines whether the position of the fingertip performing the manipulation input is located in the designated area which requires generating the vibration, the kind (type) of the application program(s) executed by the electronic device 100 is of concern to the determination.

The drive control part 240 determines whether the position represented by the position data input from the driver IC 151 is located in the designated area which requires generating the vibration by using the area data.

A second data, in which data representing kinds of the application programs (software), the area data and pattern data are associated with each other, is stored in the memory 250. The area data represents areas of the GUI input parts or the like in which the manipulation inputs are performed. The pattern data represents vibration patterns.

The drive control part 240 performs the following processes in order to interpolate a positional change of the position of the fingertip. The positional change arises in a period of time required from a point in time when the position data is input to the drive control apparatus 300 from the driver IC 151 to a point in time when the driving signal is calculated based on the position data.

The drive control apparatus 300 performs processing every designated control cycle. The drive control part 240 performs processing every designated control cycle as well. Supposing that the period of time required from the point in time when the position data is input to the drive control apparatus 300 to the point in time when the driving signal is calculated by the drive control part 240 based on the position data is Δt, the required period of time Δt is equal to a period of the single control cycle.

It is possible to calculate the moving speed of the fingertip as a velocity of a vector which has a starting point (x1, y1) represented by the position data input to the drive control apparatus 300 from the driver IC 151 and a terminal point (x2, y2) corresponding to the position of the fingertip after a lapse of the required period of time Δt.

The drive control part 240 estimates a coordinate point (x3, y3) after a lapse of the required period of time Δt by calculating a vector having a starting point (x2, y2) represented by the position data input to the drive control apparatus 300 from the driver IC 151 and a terminal point (x3, y3) corresponding to the position of the fingertip after a lapse of the required period of time Δt.

The electronic device 100 of the embodiment extrapolates the positional change of the position of the fingertip having arisen in the required period of time by estimating a coordinate point after a lapse of the required period of time Δt as described above.

The drive control part 240 performs a calculation for estimating the coordinate point after a lapse of the required period of time Δt as described above. The drive control part 240 determines whether the estimated coordinate point is located in the designated area which requires generating the vibration and generates the vibration if the estimated coordinate point is located in the designated area. Accordingly, the second designated condition is that the estimated coordinate point is located in the designated area which requires generating the vibration.

The two designated conditions required for the drive control part 240 to output the amplitude data to the amplitude modulator 320 are that the moving speed of the fingertip is more than or equal to the designated threshold speed and that the estimated coordinate point is located in the designated area which requires generating the vibration.

The drive control part 240 reads the amplitude data having the amplitude value corresponding to the moving speed from the memory 250 and outputs the amplitude data to the amplitude modulator 320 in a case where the moving speed of the fingertip is more than or equal to the designated threshold speed and the estimated coordinate point is located in the designated area which requires generating the vibration.

The memory 250 stores the first data and the second data. The first data represents the relationship between the amplitude data representing the amplitude value and the moving speed. The second data associates the data representing the kinds of the application programs (software), the area data representing the GUI input part or the like to which the manipulation input is performed and the pattern data representing the vibration pattern.

The memory 250 stores data and programs that are necessary for the application processor 220 to execute the application program and data and programs that are necessary for the communication processor 230 to perform communication processing.

The sinusoidal wave generator 310 generates sinusoidal waves used for generating the driving signal which causes the top panel 120 to vibrate at the natural vibration frequency. For example, in a case of setting the natural vibration frequency f to 33.5 kHz and causing the top panel 120 to vibrate at 33.5 kHz, a frequency of the sinusoidal waves becomes 33.5 kHz. The sinusoidal wave generator 310 outputs a sinusoidal wave signal at the ultrasound-frequency-band to the amplitude modulator 320. Although the embodiment in which the electronic device 100 includes the sinusoidal wave generator 310 is described, the electronic device 100 may include a digital sinusoidal wave generator instead of the sinusoidal wave generator 310. Further, the electronic device 100 may include a clock generator which generates clock signal having a sinusoidal-like-shape instead of the sinusoidal wave generator 310. The clock signal having low slew rate can be used instead of the sinusoidal wave signal.

The amplitude modulator 320 generates the driving signal by modulating an amplitude of the sinusoidal wave signal input from the sinusoidal wave generator 310 based on the amplitude data input from the drive control part 240. The amplitude modulator 320 modulates only the amplitude of the sinusoidal wave signal at the ultrasound-frequency-band input from the sinusoidal wave generator 310 and does not modulate a frequency and a phase of the sinusoidal wave signal in order to generate the driving signal.

Therefore, the driving signal output from the amplitude modulator 320 is a sinusoidal wave signal at the ultrasound-frequency-band obtained by modulating only the amplitude of the sinusoidal wave signal at the ultrasound-frequency-band output from the sinusoidal wave generator 310. In a case where the amplitude data is zero, the amplitude of the driving signal becomes zero. This is the same as the amplitude modulator 320 not outputting the driving signal.

In the following, the first data and the second data stored in the memory 250 are described with reference to FIG. 13.

FIG. 13 is a diagram illustrating the first data and the second data stored in the memory 250.

As illustrated in part (A) of FIG. 13, the amplitude data representing the amplitude value and the moving speed are associated in the first data. According to the first data as illustrated in part (A) of FIG. 13, the amplitude value is set to 0 in a case where the moving speed V is greater than or equal to 0 and less than b1 ($0<=V<b1$), the amplitude value is set to A1 in a case where the moving speed V is greater than or equal to b1 and less than b2 ($b1<=V<b2$), and the amplitude value is set to A2 in a case where the moving speed V is greater than or equal to b2 and less than b3 ($b2<=V<b3$).

As illustrated in part (B) of FIG. 13, the data representing the kind of the application program, the area data representing the coordinate values of areas where the GUI input parts or the like to which the manipulation inputs are performed and the pattern data representing the vibration pattern are associated in the second data.

In part (B) of FIG. 13, application program ID (Identification) is illustrated as the data representing the kind of the application program. Formulas f1 to f4 representing the coordinate values of the GUI input parts or the like to which the manipulation inputs are performed are illustrated as the area data. P1 to P4 are illustrated as the pattern data representing the vibration patterns.

The application programs identified by the application program ID included in the second data include various kinds of application programs that can be used in a smart phone or a tablet computer. The application programs also include a program which realizes an email-edit mode.

In the following, processes executed by the drive control part 240 of the drive control apparatus 300 included in the electronic device 100 according to the embodiment are described with reference to FIG. 14.

Figure 14:
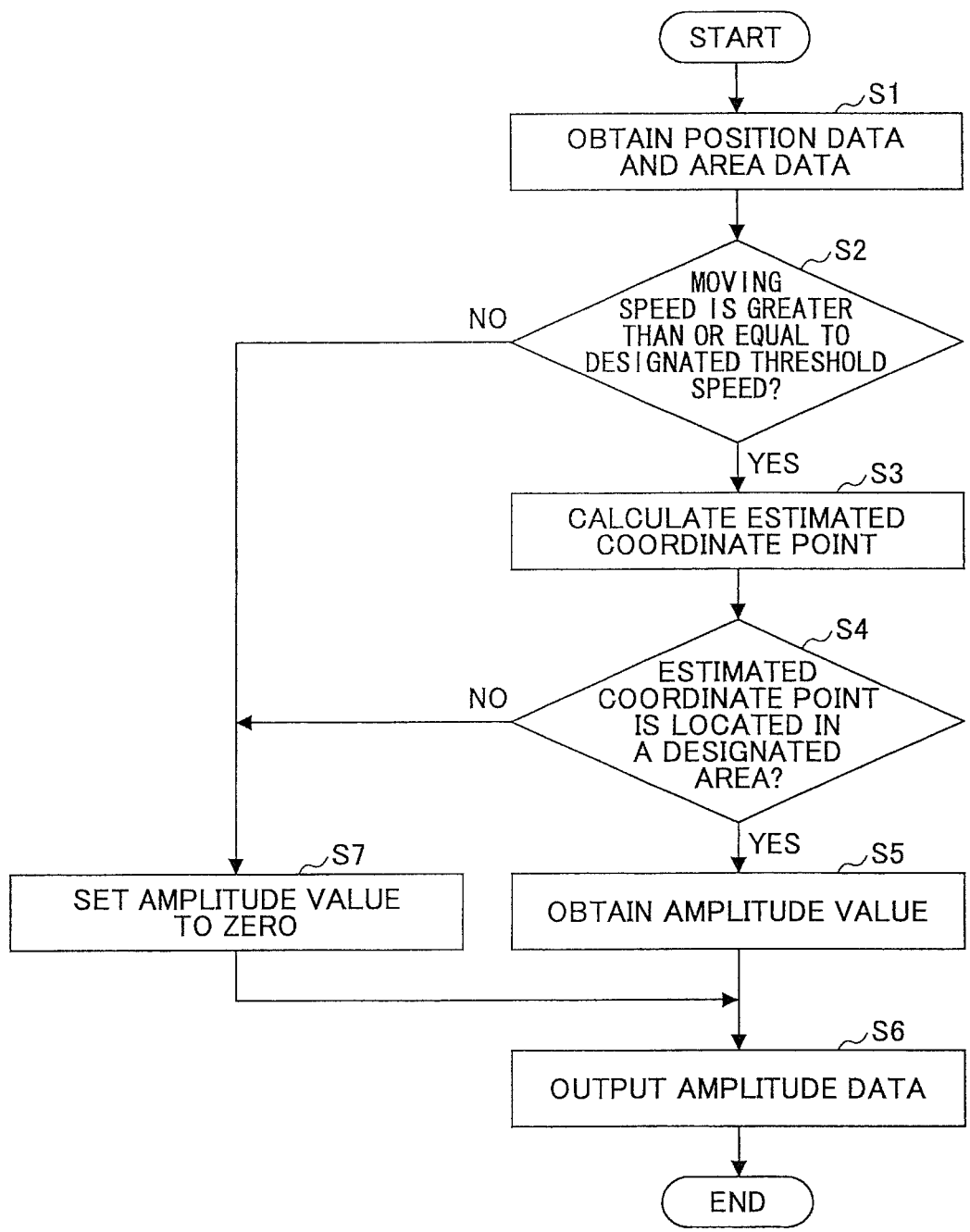
FIG. 14 is a diagram illustrating a flowchart executed by a drive control part of a drive control apparatus included in the electronic device according to the embodiment.

FIG. 14 is a diagram illustrating a flowchart executed by the drive control part 240 of the drive control apparatus 300 included in the electronic device 100 according to the embodiment.

An operating system (OS) of the electronic device 100 executes drive controls of the electronic device 100 every designated control cycle. Accordingly, the drive control apparatus 300 performs the processing every designated control cycle. The same applies to the drive control part 240. The drive control part 240 executes the flows as illustrated in FIG. 14 every designated control cycle.

Supposing that the period of time required from the point in time when the position data is input to the drive control apparatus 300 to the point in time when the driving signal is calculated by the drive control part 240 based on the position data is $\Delta t$, the required period of time $\Delta t$ is almost equal to a period of the single control cycle.

A period of time of one cycle of the control cycle can be treated as a period of time corresponding to the required period of time $\Delta t$ which is required from the point in time when the position data is input to the drive control apparatus 300 from the driver IC 151 to the point in time when the driving signal is calculated based on the position data.

The drive control part 240 starts processing when the electronic device 100 is turned on.

The drive control part 240 obtains the coordinate values represented by the present position data and the area data associated with the vibration pattern with respect to the GUI input part on which the manipulation input is being performed in accordance with the kind of the present application program (step S1).

The drive control part 240 determines whether the moving speed is greater than or equal to the designated threshold speed (step S2). The moving speed may be calculated by a vector operation. The threshold speed may be set to the minimum speed of the moving speed of the fingertip performing the manipulation input accompanied with a movement of the fingertip such as the flick operation, the swipe operation, the drag operation or the like. Such a minimum speed may be set based on an experimental result, a resolution of the touch panel 150 or the like.

The drive control part 240 calculates the estimated coordinate point after a lapse of the required period of time $\Delta t$ based on the coordinate point represented by the present position data and the moving speed, in a case where the drive control part 240 has determined that the moving speed is greater than or equal to the designated threshold speed at step S2 (step S3).

The drive control part 240 determines whether the estimated coordinate point after a lapse of the required period of time $\Delta t$ is located in an area St which is represented by the area data obtained at step S1 (step S4).

If the drive control part 240 determines that the estimated coordinate point after a lapse of the required period of time $\Delta t$ is located in the area St represented by the area data obtained at step S1, the drive control part 240 obtains the amplitude data representing the amplitude value corresponding to the moving speed calculated at step S2 from the first data (step S5).

The drive control part 240 outputs the amplitude data (step S6). As a result, the amplitude modulator 320 generates the driving signal by modulating the amplitude of the sinusoidal wave output from the sinusoidal wave generator 310, and the vibrating element 140 is driven based on the driving signal.

In a case where the control part 240 has determined that the moving speed is not greater than or equal to the designated threshold speed at step S2 (S2: NO) and in a case where the drive control part 240 has determined that the estimated coordinate point after a lapse of the required period of time Δt is not located in the area St at step S4, the drive control part 240 sets the amplitude value to zero (step S7).

As a result, the drive control part 240 outputs the amplitude data having the amplitude value set to zero, and the amplitude modulator 320 generates the driving signal by modulating the amplitude of the sinusoidal wave output from the sinusoidal wave generator 310 to zero. Accordingly, in this case, the vibrating element 140 is not driven.

In the following, examples of the operating state of the electronic device 100 according to the embodiment are described with reference to FIGS. 9 to 14.

FIGS. 9 to 14 are diagrams illustrating the examples of the operating state of the electronic device 100 according to the embodiment. In FIGS. 9 to 14, XYZ coordinate systems similar to that described in FIGS. 2 and 4 are defined.

Figure 15:
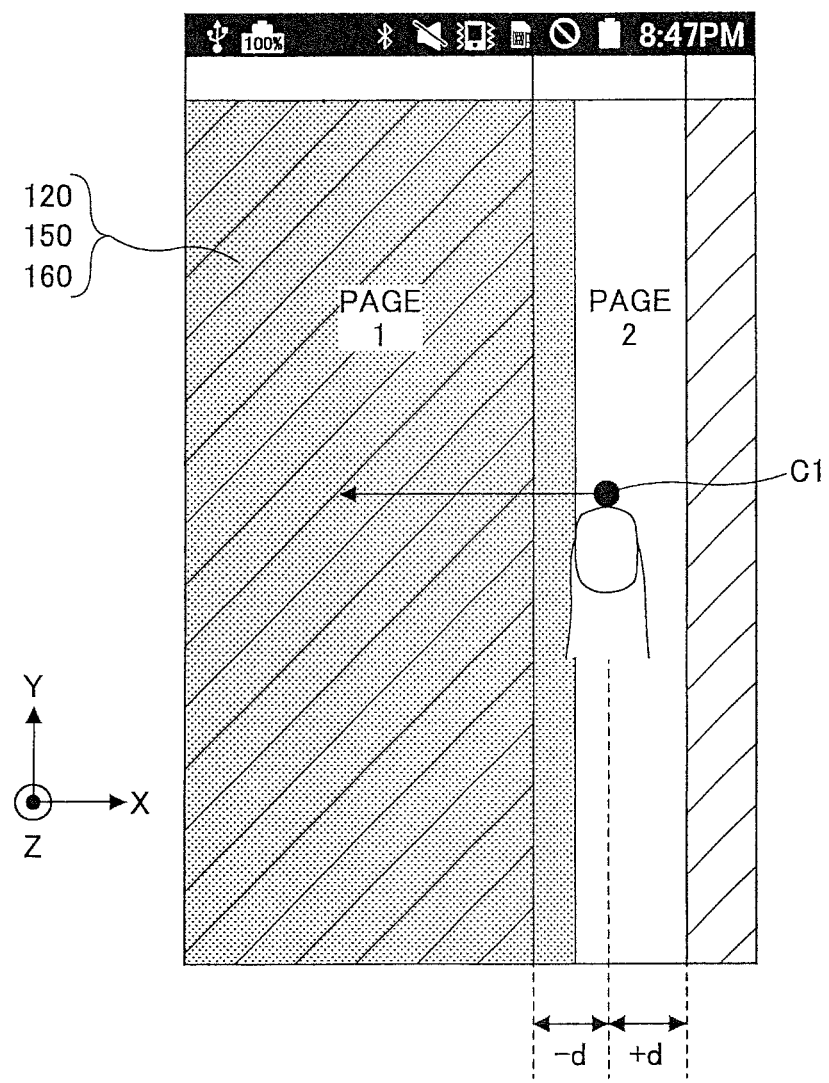
FIG. 15 is a diagram illustrating an example of an operating state of the electronic device according to the embodiment.

FIG. 15 is a diagram illustrating the top panel 120, the touch panel 150 and the display panel 160 in plan view. The user of the electronic device 100 touches the page 1 indicated in grey with the fingertip and is about to open page 2 indicated in white by performing the swipe operation leftward. Accordingly, the content displayed on the display panel 160 of the electronic device 100 is about to transit from page 1 to page 2.

In an operation mode in which the page is turned over or flipped, the drive control part 240 determines whether the manipulation input is the swipe operation. For example, the drive control part 240 determines that the manipulation input is the swipe operation, if the position of the fingertip performing the manipulation input moves for ±d mm or more in X axis direction from the starting position at which the user touches the top panel 120 first with the fingertip. The drive control part 240 generates the vibration in the top panel 120 when the position of the fingertip enters into areas with oblique lines. Each of the areas with oblique lines is the area St.

Figure 16:
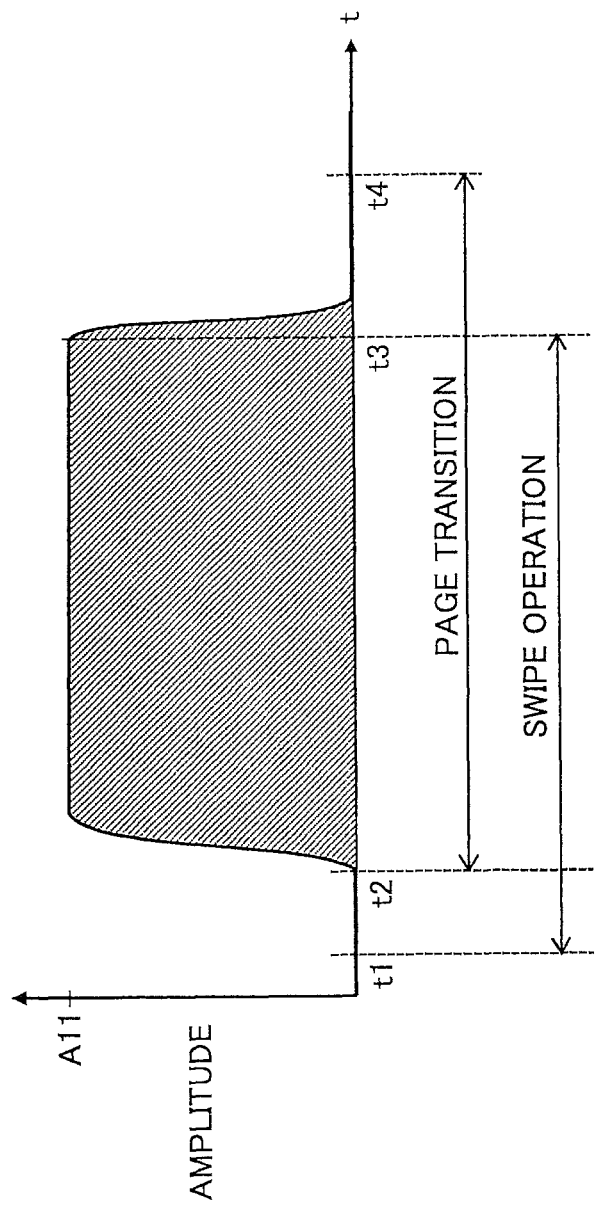
FIG. 16 is a diagram illustrating an example of an operating state of the electronic device according to the embodiment.

Next, the vibration generated in the top panel 120 in a case where the manipulation input is performed as illustrated in FIG. 15 is described. The vibration is generated based on the driving signal output from the amplitude modulator 320. The driving signal is output from the amplitude modulator 320 based on the amplitude data output from the drive control part 240. In FIG. 16, a horizontal axis represents time, and a vertical axis represents the amplitude value of the amplitude data. Here, the moving speed of the fingertip supposes almost constant when the user performs the swipe operation.

The user touches the top panel 120 at a position C1 with the fingertip and begins to move the fingertip along the surface of the top panel 120 leftward at time point t1. At time point t2 when the user has moved the fingertip for d mm from the position C1, the drive control part 240 determines that the manipulation input is the swipe operation and drives the vibrating element 140 with the vibration pattern prepared for the swipe operation. An operating distance d mm which is used for determining the swipe operation corresponds to a length of the move of the fingertip during a period of time between time point t1 and time point t2. At time point t2, the transition of the pages is started.

The amplitude of the vibration pattern prepared for the swipe operation is A11. The vibration pattern prepared for the swipe operation has a driving pattern in which the vibration continues while the swipe operation is being performed.

At time point t3 when the user releases the fingertip from the top panel 120 and finishes the swipe operation, the drive control part 240 sets the amplitude value to zero. Accordingly, the amplitude is set to zero right after time point t3. At time point t4 which follows time point t3, the transition of the pages is completed.

In a case where the user performs the swipe operation in order to turn over or flip the page as described above, the drive control part 240 outputs the amplitude data having the constant amplitude (A11), for example. Therefore, the kinetic friction force applied to the user's fingertip is reduced while the user is performing the swipe operation. As a result, it becomes possible to provide the slippery or smooth touch (texture) to the user. Accordingly, the user can recognize that the swipe operation is being accepted by the electronic device 100 through the fingertip.

Since the kinetic friction force applied to the user's fingertip is varied by generating the natural vibration at the ultrasound-frequency-band in the top panel 120, the electronic device 100 of the embodiment can provide a fine or crisp tactile sensation (tactile sense) to the user.

The electronic device 100 of the embodiment generates the driving signal by causing the amplitude modulator 320 to modulate only the amplitude of the sinusoidal wave at the ultrasound-frequency-band output from the sinusoidal wave generator 310. The frequency of the sinusoidal wave at the ultrasound-frequency-band generated by the sinusoidal wave generator 310 is equal to the natural vibration frequency of the top panel 120. The natural vibration frequency is determined in consideration of the weight of the vibrating element 140.

The driving signal is generated in the amplitude modulator 320 by modulating only the amplitude of the sinusoidal wave at the ultrasound-frequency-band generated by the sinusoidal wave generator 310 without modulating the frequency or the phase of the sinusoidal wave.

Accordingly, it becomes possible to generate the natural vibration of the top panel 120 at the ultrasound-frequency-band in the top panel 120 and to reduce the kinetic friction coefficient applied to the fingertip tracing the top panel 120 with absolute certainty by utilizing the layer of air provided by the squeeze film effect. It becomes possible to provide the fine or crisp tactile sensation as if the concavity or the convexity is existing on the surface of the top panel 120 by utilizing the Sticky-band Illusion effect or the Fishbone Tactile Illusion effect to the user.

It is possible to suppress the radiation of the ultrasound waves from the surface of the top panel 120 by optimizing the thickness t, the Young's modulus E or the like of the top panel 120 so that the wavelength λp of the standing wave generated on the top panel 120 becomes smaller than the wavelength λa of the ultrasound waves in the air at the frequency of the driving signal in the ultrasound-frequency-band.

It is possible to reflect, shield or absorb the ultrasound waves by using the walls 180A and 180B having the heights H satisfying formula (6), even if the ultrasound waves are radiated from the surface of the top panel 120.

Since the electronic device 100 generates the vibration in a case where the estimated coordinate point after the lapse of the required period of time Δt corresponding to the period of time of one cycle of the control cycle is located in the designated area which requires generating the vibration, it becomes possible to generate the vibration while the fingertip is touching the designated GUI input part or the like.

In a case where a delay corresponding to the required period of time Δt does not matter at all, the electronic device 100 may not perform the calculation of the estimated coordinate.

In the embodiment as described above, for the sake of providing the sense as if the concavity or the convexity is existing on the top panel 120 to the user, the vibrating element 140 is switched on or off. Turning off the vibrating element 140 is equal to setting the amplitude value represented by the driving signal used for driving the vibrating element 140 to zero.

However, it is not necessary to turn off the vibrating element 140 from a being turned on state. For example, the vibrating element 140 is driven based on the driving signal having a small amplitude instead of turning off the vibrating element 140. For example, the electronic device 100 may provide the sense as if the concavity or the convexity is existing on the surface of the top panel 120 by reducing the amplitude to about one-fifth of that of the turned on state.

In this case, the vibrating element 140 is driven by the driving signal in a manner that the vibration of the vibrating element 140 is switched between a strong level and weak level. As a result, the strength of the natural vibration generated in the top panel 120 is switched between the strong level and the weak level. It becomes possible to provide the sense as if the concavity or the convexity is existing on the surface of the top panel 120 through the user's fingertip.

If the electronic device 100 turns off the vibrating element 140 when making the vibration weaker in order to switch the vibration of the vibrating element 140 from the strong level to the weak level, the vibrating element 140 is switched off. Switching on and off the vibrating element 140 means driving the vibrating element 140 intermittently.

As described above with reference to FIGS. 10 and 11, the electronic device 100A according to the variation example includes the walls 180A and 180B. The electronic device 100A is the variation example of the electronic device 100 as illustrated in FIGS. 1 to 9. The walls 180A and 180B are the cuboid members.

Figure 17:
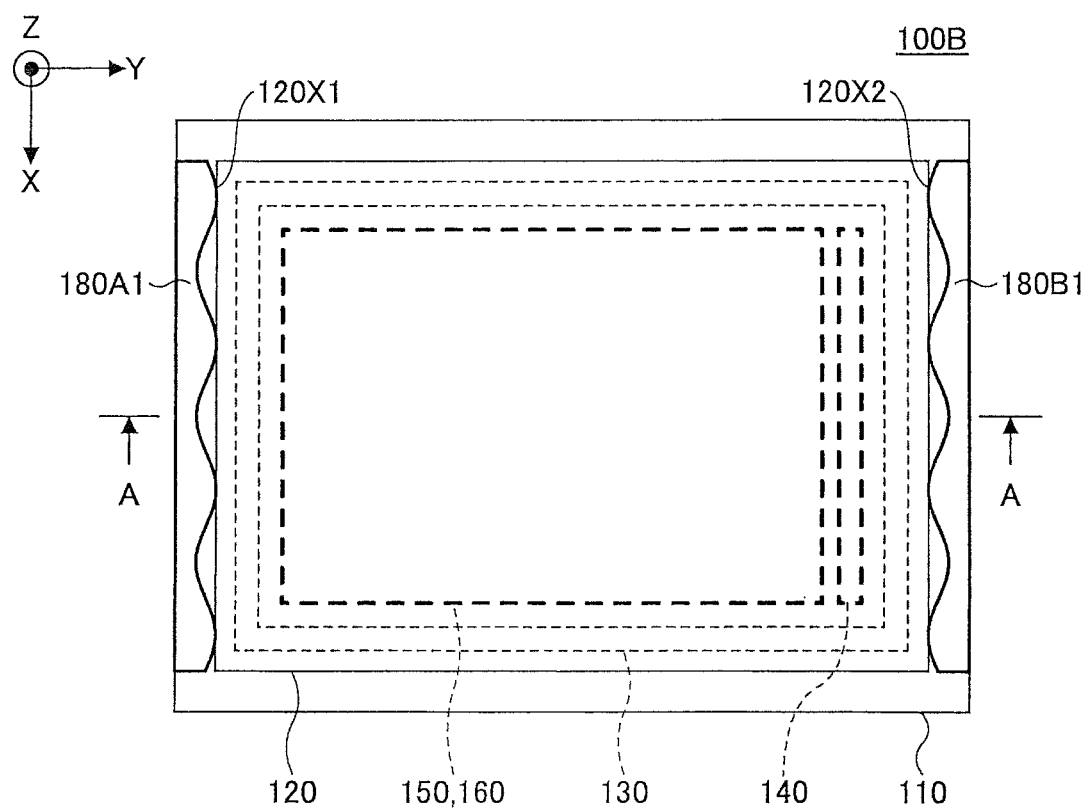
FIG. 17 is a diagram illustrating an electronic device according to a second variation example of the embodiment in plan view.

However, the walls 180A and 180B may be varied as illustrated in FIG. 17.

FIG. 17 illustrates an electronic device 100B according to a second variation example of the embodiment in plan view. In FIG. 17, a XYZ coordinate system similar to that described in FIGS. 2 to 3 is defined. FIG. 17 illustrates a configuration of the electronic device 100B in plan view.

Wall 180A1 of the electronic device 100B has a corrugated surface on positive-side in Y axis direction. The corrugated surface of the wall 180A1 faces toward the top panel 120. Wall 180B1 of the electronic device 100B has a corrugated surface on negative-side in Y axis direction. The corrugated surface of the wall 180B1 faces toward the top panel 120. It is possible to reflect the ultrasound waves radiated from the top panel 120 irregularly by using the walls 180A1 and 180B1. Further, it is possible to difuse the reflected ultrasound waves in various directions.

In the embodiment as described above, the wavelength λp of the standing wave generated on the top panel 120 is shorter than the wavelength λa of the ultrasound waves in the air at the frequency of the driving signal in the ultrasound-frequency-band.

In a case where it is difficult to make the wavelength λp shorter than the wavelength λa, the radiation of the ultrasound waves may be suppressed by providing walls having heights obtained by the angle θ satisfying formula (3).

According to the embodiment as described above, the drive control apparatus 300, the electronic device 100 and the drive control method that can provide the fine or crispy tactile sensation to the user are provided.

In the following, another variation examples of the electronic device 100 of the embodiment (see FIG. 3) will be described with reference to FIGS. 18 to 21.

Figure 18:
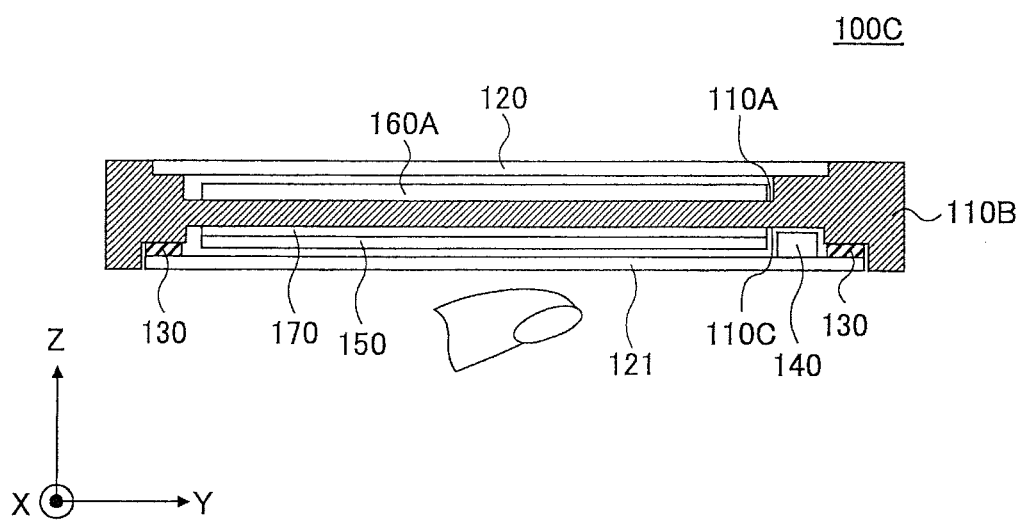
FIG. 18 is a diagram illustrating an electronic device according to a third variation example of the embodiment in a cross-sectional view.

FIG. 18 illustrates an electronic device 100C according to a third variation example of the embodiment in a cross-sectional view. The cross-section as illustrated in FIG. 18 corresponds to the cross-section taken along the line A-A in FIG. 3. In FIG. 18, a XYZ coordinate system similar to that described in FIGS. 2 to 3 is defined.

The electronic device 100C includes a housing 110B, a top panel 120, panel 121, a double-faced adhesive tape 130, a vibrating element 140, a touch panel 150, a display panel 160A and a substrate 170.

The electronic device 100C has a configuration in which the touch panel 150 is disposed on the back surface side of the electronic device 100 as illustrated in FIG. 3. Therefore, the double-faced adhesive tape 130, the vibrating element 140, the touch panel 150 and the substrate 170 are disposed on the back surface side compared with the electronic device 100 as illustrated in FIG. 3.

The housing 110B has a concave portion 110A located on positive side in Z axis direction and concave portion 110C located on negative side in Z axis direction. The display panel 160A is disposed in the concave portion 110A and is covered by the top panel 120. The touch panel 150 and the substrate 170 are stacked with each other and are disposed in the concave portion 110C. The panel 121 is adhered to the housing 110B by the double-faced adhesive tape 130. The vibrating element 140 is attached on a positive-side-surface of the panel 121 in Z axis direction.

According to the third variation embodiment, the electronic device 100C can provide the fine or crispy tactile sensation to the user's fingertip corresponding to images displayed on the display panel 160 in a manner similar to the electronic device 100 illustrated in FIG. 3 by generating the natural vibration in the ultrasound-frequency-band on the panel 120A. The natural vibration is generated on the panel 120A by switching on and off the vibrating element 140 in accordance with the manipulation input performed onto the top panel 120A.

In FIG. 18, the touch panel 150 is provided on the back surface side of the electronic device 100C. However, another touch panel similar to the touch panel 150 may be provided on front surface side of the electronic device 100C. This condiguration is realized by combining the configuration as illustrated in FIG. 3 and the configuration as illustrated in FIG. 18, i.e., the electronic device 100C may include two touch panels.

Figure 19:
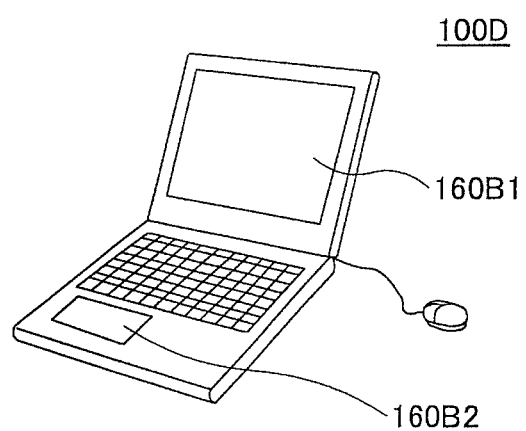
FIG. 19 is a diagram illustrating an electronic device according to a fourth variation example of the embodiment in a perspective view.

FIG. 19 illustrates an electronic device 100D according to a fourth variation example of the embodiment in a perspective view. The electronic device 100D is a notebook type personal computer (PC).

PC 100D includes a display panel 160B1 and a touch pad 160B2.

Figure 20:
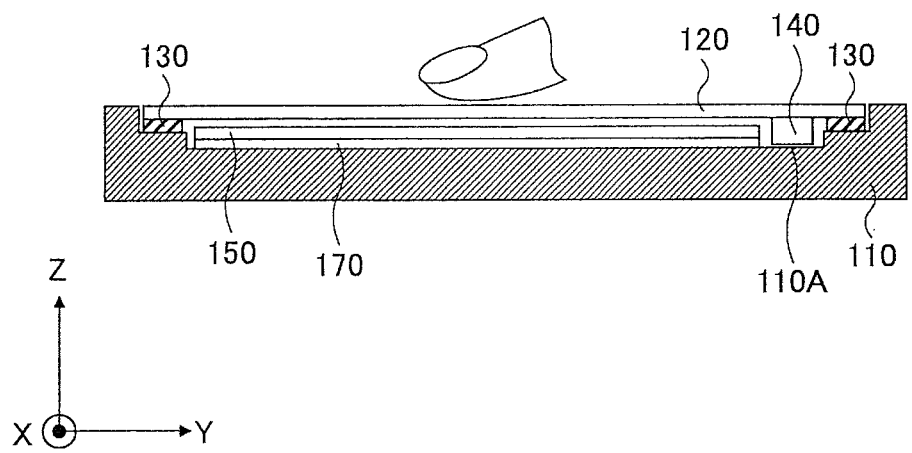
FIG. 20 is a diagram illustrating a touch pad in a cross-sectional view.

FIG. 20 illustrates the touch pad 160B2 in a cross-sectional view. The cross-section as illustrated in FIG. 20 corresponds to the cross-section taken along the line A-A in FIG. 3. In FIG. 20, a XYZ coordinate system similar to that described in FIGS. 2 to 3 is defined.

The touch pad 160B2 has a configuration obtained by getting rid of the display panel 160 from the electronic device 100 as illustrated in FIG. 3.

According to the fourth variation embodiment, the electronic device 100D switches on and off the vibrating element 140 in accordance with the manipulation input performed onto the top panel 120 and generates the natural vibration in the ultrasound-frequency-band on the top panel 120. It is possible to provide the fine or crispy tactile sensation to the user's fingertip corresponding to travel distance of the manipulation input in a manner similar to the electronic device 100 illustrated in FIG. 3.

Moreover, if the electronic device 100D includes a vibrating element disposed on a back surface side of the display panel 160B1, it becomes possible to provide the fine or crisp tactile sensation to the user's fingertip corresponding travel distance of the manipulation input performed on the display panel 160B1 in a manner similar to the electronic device 100 illustrated in FIG. 3. In this case, the electronic device 100D may include the electronic device 100 as illustrated in FIG. 3 instead of the display panel 160B1.

Figure 21:
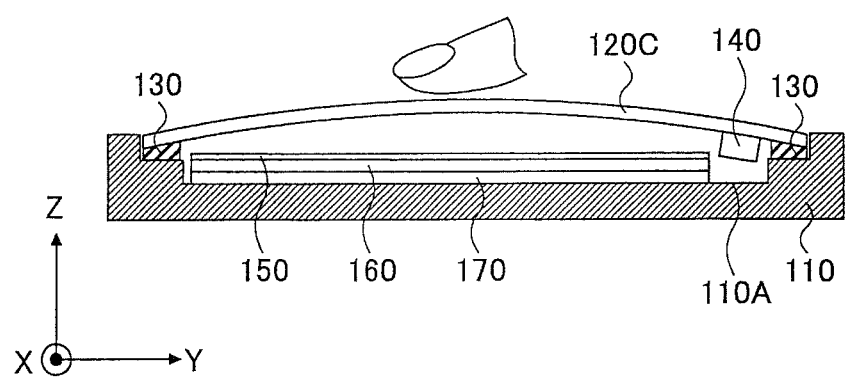
FIG. 21 is a diagram illustrating an electronic device according to a fifth variation example of the embodiment in a cross-sectional view.

FIG. 21 illustrates an electronic device 100E according to a fifth variation example of the embodiment in a cross-sectional view.

The electronic device 100E includes a housing 110, a top panel 120C, a double-faced adhesive tape 130, a vibrating element 140, a touch panel 150, a display panel 160 and a substrate 170.

The electronic device 100E is similar to the electronic device 100 as illustrated in FIG. 3 except for the top panel 120C which is constituted of a curved glass.

The top panel 120C is curved in a manner that the central portion in plan view convexes on positive side in Z axis direction. Although FIG. 21 illustrates a cross-section of the top panel 120C parallel to YZ plane, the top panel 120C has a convexed shape similar to that illustrated in FIG. 21 in a cross-section parallel to XZ plane.

It is possible to provide the fine or crispy tactile sensation to the user by including the curved top panel 120C. Particularly, the curved top panel 120C is very effective in a case where an object which is displayed in the display panel 160 has a rounded shape.

According to the embodiment as described above, the drive control apparatus 300, the electronic device 100 and the drive control method that can provide the fine or crisp tactile sensation to the user are provided.

It becomes possible to provide the drive control apparatus 300, the electronic device 100 and the drive control method that can provide a fine or crisp tactile sensation to a user.

In the above description, a drive control apparatus, an electronic device and a drive control method according to embodiments are described. However, the present invention is not limited to the embodiments specifically disclosed. A person skilled in the art may easily achieve various modification and changes without departing from the scope of the present invention.

The other objects, features, and benefits of the present application may become further clear by referring to the accompanying drawing and embodiments described above.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the sprit and scope of the invention.

What is claimed is:

1. An electronic device comprising:
    a top panel having a manipulation input surface;
    a position detector detecting a position of a manipulation input performed on the manipulation input surface;
    a vibrating element generating a vibration in the manipulation input surface; and
    a drive control part being configured to drive the vibrating element by using a driving signal causing the vibrating element to generate a natural vibration in an ultrasound-frequency-band in the manipulation input surface, the drive control part being configured to drive the vibrating element so as to vary an intensity of the natural vibration in accordance with the position of the manipulation input performed onto the manipulation input surface and a temporal change degree of the position,
    wherein a thickness of the top panel is set to a thickness that makes a wavelength of a standing wave generated on the top panel by the natural vibration shorter than a wavelength of an ultrasound wave in the air at a frequency of the driving signal.

2. The electronic device as claimed in claim 1, further comprising:
    a display part disposed on an opposite side of the manipulation input surface with respect to the top panel.

3. The electronic device as claimed in claim 1, further comprising:
    a first wall configured to reflect or shield the ultrasound wave radiated from the top panel; and
    a second wall configured to reflect or shield the ultrasound wave radiated from the top panel,
    wherein the top panel has a rectangular shape in plan view, the rectangular shape being constituted of a first side, a second side, a third side and a fourth side connected in this order,
    wherein the vibrating element is attached to the top panel along the first side,
    wherein the first wall is located along the first side, and
    wherein the second wall is located along the third side located opposite to the first side in plan view.

4. The electronic device as claimed in claim 3, further comprising:
    a housing disposed along the first side and the third side and located outside of the top panel,
    wherein the first wall and the second wall are attached to the housing at locations outside of the top panel in plan view.

5. The electronic device as claimed in claim 4, wherein height H of the first wall is calculated as H=L×tan θ, where L represents length between the third side and the first wall and θ represents an elevation angle of a top end of the first wall as viewed from the third side with respect to the top panel, and wherein height of the second wall is the same as the height H of the first wall.

6. The electronic device as claimed in claim 4, wherein the first wall includes a first concavity and a first convexity formed on a surface facing toward the top panel, and the second wall includes a second concavity and a second convexity formed on a surface facing toward the top panel.

7. The electronic device as claimed in claim 1, wherein the driving signal causes the vibrating element to generate the natural vibration in the ultrasound-frequency-band in the manipulation input surface, the natural vibration having a constant frequency and a constant phase.

8. The electronic device as claimed in claim 2, wherein the drive control part drives the vibrating element so as to vary the intensity of the natural vibration when the position of the manipulation input moves across a boundary of a GUI input part displayed on the display part or moves while the GUI input part is being manipulated.

9. The electronic device as claimed in claim 2, wherein the drive control part drives the vibrating element so as to vary the intensity of the natural vibration when the position of the manipulation input moves across pages of picture images displayed on the display part.

10. The electronic device as claimed in claim 2, wherein the drive control part drives the vibrating element so as to vary the intensity of the natural vibration when the position of the manipulation input moves in an area of a designated GUI input part displayed on the display part.

11. The electronic device as claimed in claim 1, wherein the manipulation input surface has a rectangular shape having long sides and short sides in plan view, and wherein the drive control part causes the vibrating element to vibrate so that a standing wave of which amplitude varies along the long side occurs on the manipulation input surface.

12. The electronic device as claimed in claim 1, wherein the drive control part estimates the position of the manipulation input after an elapse of a designated period of time based on the temporal change degree of the position, and drives the vibrating element so as to vary the intensity of the natural vibration in accordance with the estimated position of the manipulation input.

13. A drive control method for driving a vibrating element of an electronic device including a top panel having a manipulation input surface, a position detector detecting a position of a manipulation input performed on the manipulation input surface and the vibrating element generating a vibration in the manipulation input surface, comprising:

driving, by a computer, the vibrating element by using a driving signal causing the vibrating element to generate a natural vibration in an ultrasound-frequency-band in the manipulation input surface, the driving being configured to drive the vibrating element so as to vary an intensity of the natural vibration in accordance with the position of the manipulation input performed onto the manipulation input surface and a temporal change degree of the position, wherein a thickness of the top panel is set to a thickness that makes a wavelength of a standing wave generated on the top panel by the natural vibration shorter than a wavelength of an ultrasound wave in the air at a frequency of the driving signal.

\* \* \* \* \*